United States Patent [19]
Takeuchi et al.

[11] Patent Number: 5,874,184
[45] Date of Patent: Feb. 23, 1999

[54] SOLID POLYMER ELECTROLYTE, BATTERY AND SOLID-STATE ELECTRIC DOUBLE LAYER CAPACITOR USING THE SAME AS WELL AS PROCESSES FOR THE MANUFACTURE THEREOF

[75] Inventors: Masataka Takeuchi; Koji Tokita; Miyuki Ueda; Jun Noguchi; Hideo Yashima; Eri Tamura; Kazuhiko Ooga, all of Chiba, Japan

[73] Assignee: Showa Denko K.K., Tokyo, Japan

[21] Appl. No.: 892,849

[22] Filed: Jul. 11, 1997

Related U.S. Application Data

[63] Continuation of Ser. No. 478,760, Jun. 7, 1995, Pat. No. 5,665,490, which is a continuation-in-part of Ser. No. 343,603, Jan. 30, 1995, Pat. No. 5,597,661.

[30] Foreign Application Priority Data

| Jun. 3, 1993 | [JP] | Japan | 5-133620 |
| Nov. 29, 1993 | [JP] | Japan | 5-323192 |
| Nov. 29, 1993 | [JP] | Japan | 5-323193 |
| Mar. 4, 1994 | [JP] | Japan | 6-060067 |
| May 24, 1994 | [JP] | Japan | 6-133839 |
| Aug. 18, 1994 | [JP] | Japan | 6-218260 |
| Oct. 13, 1994 | [JP] | Japan | 6-274369 |
| Feb. 21, 1995 | [JP] | Japan | 7-056514 |

[51] Int. Cl.$^6$ ........................................................ H01M 4/02
[52] U.S. Cl. .................... 429/192; 252/62.6; 252/500; 252/518; 361/523
[58] Field of Search ........................ 429/192, 212, 429/213, 218; 29/623.1, 623.5; 252/62.6, 500, 518; 361/523, 212, 301.1, 305, 306.3, 311, 361

[56] References Cited

U.S. PATENT DOCUMENTS 4,357,401  11/1982  Andre et al.

(List continued on next page.)

FOREIGN PATENT DOCUMENTS 547109  10/1985  Australia.

(List continued on next page.)

OTHER PUBLICATIONS

Wright, Br. Polym. J., 7:319–327 (1975) Month N/A.
Kobayashi et al., J. Phys. Chem., 89:987–991 (1985) Month N/A.
Llopmpart et al., J. Electrochem. Soc., 138(3):665–669 (1991) (Month N/A).

(List continued on next page.)

*Primary Examiner*—M. Nuzzolillo
*Attorney, Agent, or Firm*—Sughrue, Mion, Zinn, Macpeak & Seas, PLLC

[57] ABSTRACT

A solid polymer electrolyte comprising a composite of (a) a polymeric component which comprises (i) a polymer obtained from at least one compound represented by general formula (IA), (IIA) and/or (IIIA) as described in the specification; or (ii) a polymer obtained from at least one compound having alcoholic hydroxyl groups wherein at least one hydrogen atom of said alcoholic hydroxyl groups is replaced by a unit represented by general formula (X) or (XI) as described in the specification, and (b) at least one electrolyte salt, which has a high ionic conductivity and can be made into a thin film. The present invention is also directed to an electrode comprising the solid polymer electrolyte and an electroactive substance or polarizable material; as well as a process for manufacturing the same. In addition, the present invention is directed to a primary an secondary battery having the solid polymer electrolyte, as well as a process for manufacturing the same. The battery of the present invention has a high capacity, high current density, and, in the case of a secondary battery, has good cyclability. Finally, the present invention is directed to a solid-state electric double layer capacitor comprising the solid polymer electrolyte, as well as a process for manufacturing the same. The electric double layer capacitor has a high output voltage and a large take-out current.

20 Claims, 2 Drawing Sheets

U.S. PATENT DOCUMENTS

| | | |
|---|---|---|
| 4,792,504 | 12/1988 | Schwab et al. . |
| 5,223,353 | 6/1993 | Kawasaki et al. . |
| 5,332,631 | 7/1994 | Abraham et al. .......................... 429/48 |
| 5,376,478 | 12/1994 | Kakacho et al. ......................... 429/192 |
| 5,378,381 | 1/1995 | Takeuchi et al. ........................ 429/192 |
| 5,665,490 | 9/1997 | Takeuchi et al. ........................ 429/192 |

FOREIGN PATENT DOCUMENTS

| | | |
|---|---|---|
| 0315876 | 11/1988 | European Pat. Off. . |
| 0576686 | 5/1994 | European Pat. Off. . |
| 63-244570 | 10/1988 | Japan . |
| 4253771 | 1/1991 | Japan . |
| 2202848 | 5/1988 | United Kingdom . |
| WO9304507 | 3/1993 | WIPO . |

OTHER PUBLICATIONS

Russell, The 173rd Electrochemical Society Meeting Atlanta, Georgia, 135(3):332 (1988) (Month N/A).

Blonsky et al. J. Amer. Checm. Soc., 106:6854–6855 (1984) (Month N/A).

Ziaryo, Material Report R&D, pp. 33–41 (Feb. 1989).

Nakajima et al. The 27th Symposium on Battery, 3A05L–3A06L (1986) (Month N/A).

F I G. 2
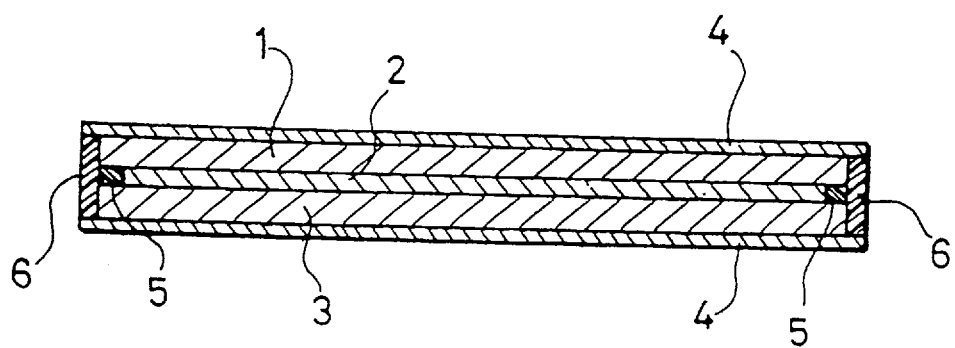
F I G. 3
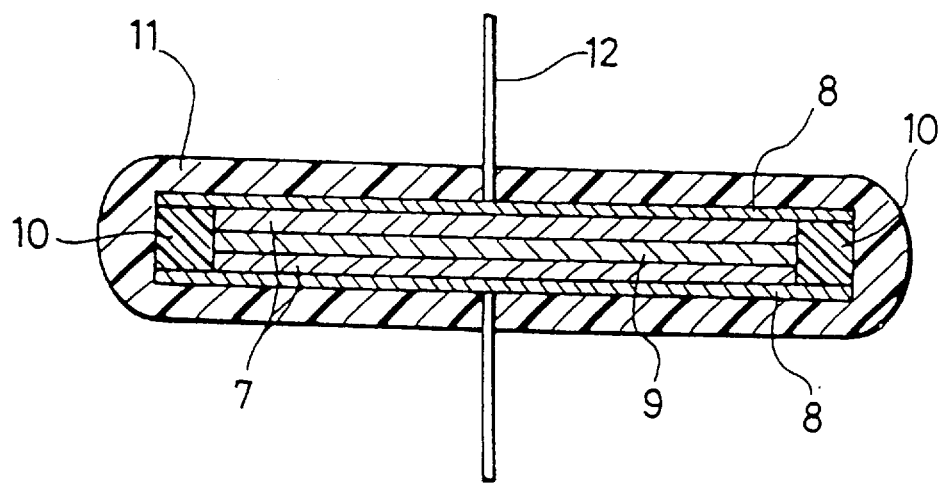

SOLID POLYMER ELECTROLYTE, BATTERY AND SOLID-STATE ELECTRIC DOUBLE LAYER CAPACITOR USING THE SAME AS WELL AS PROCESSES FOR THE MANUFACTURE THEREOF

This is a continuation of application Ser. No. 08/478,760 filed Jun. 7, 1995 now U.S. Pat. No. 5,665,490, which is a CIP Ser. No. 08/343,603, now U.S. Pat. No. 5,597,661.

DESCRIPTION

The invention is directed to a solid polymer electrolyte, a battery and a solid-state electric double layer capacitor using the same, as well as processes for the manufacture thereof.

TECHNICAL FIELD

The present invention relates to a solid polymer electrolyte having high ionic conductivity using a polymer having an oxyalkyl side chain that contains a urethane bond; an electrode comprising such a polymer and a process for manufacturing the same; a battery comprising such a solid polymer electrolyte or such an electrode and a process for manufacturing the same; and an electric double layer capacitor using such a solid polymer electrolyte and a process for manufacturing the same.

BACKGROUND ART

In the field of ionics, there is a trend to develop solid electrolytes as new ionic conductors to replace conventional electrolyte solutions and to develop applications for solid-state primary or secondary batteries and electric double layer capacitors. Conventional products, such as batteries with electrolyte solutions, have problems in long-term reliability, since leakage of the electrolyte solution out of the parts or elution of the electrode substance tends to occur. In contrast, products with solid electrolytes do not cause such problems and it is easy to decrease their thickness. Furthermore, solid electrolytes have excellent thermal resistance and are advantageous in manufacturing products such as batteries.

Among batteries using a solid electrolyte, those using a polymer as a main component of the electrolyte have increased flexibility as compared with those using an inorganic substance, which allows the former to be processed into vari ous forms. However, such products as hitherto studied still have the problem that only a small amount of current can be taken out, since the solid polymer electrolyte has low ionic conductivity.

An example of such a solid polymer electrolyte is described in the *British Polymer Journal* (*Br. Polym. J.*), 7:319–327 (1975), which states that a compounded material consisting of a polyethylene oxide and a n inorganic alkali metal salt exhibits ionic conductivity as low as $10^{-7}$ S/cm at room temperature.

Recently, there have been many reports that a comb-shaped polymer having an oligooxyethylene in each side chain has improved ionic conductivity due to increased thermal motion of the oxyethylene chain, which contributes ionic conductivity. An example in which a polymethacrylic acid, having an oligooxyethylene added to its side chain, is compounded with an alkali metal salt is described in the *Journal of Physical Chemistry* (*J. Phys. Chem.*), Vol. 89, page 987 (1985). Another example where polyphosphazene, having an oligooxyethylene side chain, is compounded with an alkali metal salt is described in the Journal of *American Chemical Society* (*J. Am. Chem. Soc.*), Vol. 106, page 6854 (1984).

Recently, many studies have been made on lithium secondary batteries in which metal oxides or metal sulfides, such as $LiCoO_2$, $LiNiO_2$, $LiMnO_2$ and $MoS_2$, are used as positive electrodes. For example, batteries using positive electrodes made of $MnO_2$ or $NiO_2$ are reported in the *Journal of Electrochemical Society* (*J. Electrochem. Soc.*), Vol. 138 (No. 3), page 665 (1991). These batteries have drawn attention since they have high gravimetric or volumetric capacity.

Many reports have been made on batteries using an electroconductive polymer as an electroactive material. For example, a lithium secondary battery using polyanilines as the positive electrode has already been put on the market in the form of a coin-type battery for use as a backup source, by Bridgestone Co., Ltd. and Seiko Co., Ltd. as reported in, for example, "The 27th Symposium on Battery 3A05L and 3A06L" (1986). Polyaniline also attracts attention as an electroactive material for positive electrodes having high capacity and flexibility.

Lately, electric double layer capacitors which comprise polarizable electrodes made of a carbon material having a large specific area, such as activated carbon or carbon black, and an ionic conducting solution arranged between the electrodes, have been widely used as a memory backup source. For example, a capacitor having carbon-based polarizable electrodes and an organic electrolyte solution is described in "Kinou Zairyo", February 1989, page 33. An electric double layer capacitor using an aqueous sulfuric acid solution is described in "The 173rd Electrochemical Society Meeting Atlanta Georgia", May, 135(3):332 (1988). Also, a capacitor using highly electroconductive $Rb_2Cu_3I_3Cl_7$ as an inorganic solid electrolyte is disclosed in Japanese Patent Application Laid-open No. 63-244570 (1988).

However, electric double layer capacitors using conventional electrolyte solutions have long-term use and reliability problems since leakage of the solution out of the capacitor tends to occur when used for a long time or when a high voltage is applied. On the other hand, electric double layer capacitors using conventional inorganic based ionic conducting substances have a problem in that the ionic conducting substance decomposes even at a low voltage and, hence, the output voltage is low.

The use of an ionic conducting substance using a polyphosphazene based polymer for a capacitor is disclosed in Japanese Patent Application Laid-open No. 4-253771 (1992). A capacitor using such an ionic conducting substance containing a polymer as the main component has an output voltage higher than the inorganic substance based ionic conducting substance, can be processed into various forms, and is easily sealed.

In this case, the ionic conductivity of the solid polymer electrolyte, which is as low as $10^{-4}$ to $10^{-6}$ S/cm, is still unsatisfactory and is defective in that the take-out current is small. Although it is possible to increase the ionic conductivity of the solid polymer electrolyte by the addition of a plasticizer, which gives fluidity to the electrolyte, it means that the electrolyte can no longer be treated as a complete solid. As a result, the film made of this polymer has poor film strength and the polymer has poor film formability and, hence, a short-circuit tends to occur when the polymer is used in an electric double layer capacitor or a battery and there is difficulty in sealing, as in the case of liquid ionic conducting substances. In addition, when it is assembled with a polarizable electrode, such as a carbon material, to produce a capacitor, it is difficult to homogeneously compound the solid polymer electrolyte with a carbon material having a large specific surface area, since both materials are solid.

The ionic conductivity of solid polymer electrolytes studied so far has improved up to about $10^{-4}$ to $10^{-5}$ S/cm, which is over two digits lower than that of liquid ionic conducting substances. Besides, at a temperature no higher than 0° C., ionic conductivity drastically decreases to a lower level. Furthermore, when these solid electrolytes are incorporated in a device, such as an electric double layer capacitor, or incorporated in a battery in the form of a thin film, manufacturing problems arise since the solid electrolyte is hard to compound with the electrode and it is difficult to achieve a satisfactory contact between the electrolyte and the electrode.

OBJECT OF THE INVENTION

An object of the present invention is to provide a solid polymer electrolyte which has good strength when molded into a film, has high ionic conductivity at room temperature and at low temperatures, and has excellent processability.

Also, an object of the present invention is to provide, using such a solid polymer electrolyte, primary and secondary batteries which are easy to make in the form of a thin film, and can operate at high capacity and at high voltage, and which also have good cyclability and good reliability, and a process for manufacturing the same.

Another object of the present invention is to provide, using such a solid polymer electrolyte, a lithium battery which can operate at high capacity and at high voltage and which also has good cyclability and good reliability, and a process for manufacturing the same.

Further, an object of the present invention is to provide, using such a solid polymer electrolyte, a lithium ion battery which can operate at high capacity and at high voltage, and which also has good cyclability and good reliability, and a process for manufacturing the same.

Also, an object of the present invention is to provide an electrode having high electrochemical activity and flexibility, as well as to provide secondary batteries using the same.

Another object of the present invention is to provide a process for manufacturing an electrode, comprising a solid polymer electrolyte, having high electrochemical activity and flexibility, as well as to provide a process for manufacturing secondary batteries using the same.

Another object of the present invention is to provide an electrode, usable in electric double layer capacitors, which has good polarizability, good strength when formed into a film and good contactibility with solid electrolytes, and a process for manufacturing the same.

Further, another object of the present invention is to provide an electric double layer capacitor which gives a high output voltage, and a high take-outlcurrent, is excellent in processability, and reliability, using a solid polymer electrolyte which has high ionic conductivity at room temperature and at lower temperatures, and has excellent film strength and processability, and a process for manufacturing the same.

SUMMARY OF THE INVENTION

The present inventors have found that a solid polymer electrolyte having good film strength when processed into a film and high ionic conductivity can be obtained by using a polymer which has a side chain containing an oxyalkyl group and by introducing a urethane bond onto the side chain. Throughout this specification, the term "oxyalkyl" includes oligooxyalkylene and polyoxyalkylene, each containing at least one oxyalkylene group; and the term "side chain" includes cross-linking side chains.

Further, the present inventors have found that the use of the above solid polymer electrolyte in batteries improves ionic conductivity, film strength, and processability, and solves the above-mentioned problems of the conventional art.

The present inventors consider that it is important to provide the electrode in the form of a thin film when, for example, fabricating a thin solid-state battery using such a solid polymer electrolyte. The present inventors found that the use of electroconductive polyaniline and its derivatives, which are excellent electroactive substances, specifically, polyaniline or its derivatives soluble in organic solvents or other electroconductive polymers, metal oxides, metal sulfides, carbon materials or other electroactive substances (positive electrode materials or negative electrode materials), in combination with a polymer which has an oxyalkyl side chain containing a urethane bond, makes it possible to form an electrode having high electrochemical activity and flexibility and allows for the manufacture of electrodes, in the form of a thin film, by the solvent cast method or other suitable method without deteriorating the electrochemical activity of the electroactive substances.

Throughout this specification and claims, polyaniline and its derivatives are generally or collectively referred to as "an aniline-based polymer" (in the singular) or "aniline-based polymers" (in the plural).

Still further, the present inventors have found that the use of such carbon materials, as will be mentioned later, which can be used as a polarizable electrode in an electric double layer capacitor in combination with a polymer that has an oxyalkyl side chain containing a urethane bond, makes it possible to form a polarizable electrode suitable for use in such a capacitor and enables the electrode to be manufactured in the form of a thin film by a solvent cast method or other suitable method.

Still further, the present inventors have found that the use of the above-mentioned solid polymer electrolyte gives rise to an electric double layer capacitor which has a high output voltage and a high take-out current, and which has excellent processability and reliability, and enables a solid-state electric double layer capacitor to be manufactured.

In order to achieve the above-described object, the present invention provides:

1) A solid polymer electrolyte comprising a composite of:
   (a) a polymer obtained from at least one compound having alcoholic hydroxyl groups, wherein at least one hydrogen atom of the alcoholic hydroxyl groups is replaced by a unit represented by general formula (X) below:

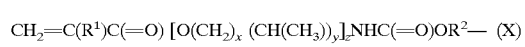

$CH_2=C(R^1)C(=O)[O(CH_2)_x(CH(CH_3))_y]_zNHC(=O)OR^2—$ (X)

wherein $R^1$ represents a hydrogen or a methyl group; $R^2$ represents a divalent organic group containing at least one oxyalkylene group and the organic group may be linear, branched or cyclic and may contain one or more atoms other than carbon, hydrogen or oxygen, x and y each represents zero or a number of between 1 and 5; z represents zero or a numerical value of between 1 and 10, provided that z is zero when both of x and y are zero; wherein the unit of $[O(CH_2)_x(CH(CH_3))_y]_z$ may comprise substituents $(CH_2)$ and $(CH(CH_3))$ in various arrangements; provided that each of $R^1$, $R^2$, x, y, and z of each such unit in the compound may independently represent the above-mentioned atom, group, number, or value, respectively and is not necessary to be the same as such of the other said unit in the compound and/or a copolymer comprising at least one of the above compounds as a co-monomer (hereinafter, the above polymer and copolymer will be generally referred to as "(M)AE polymer"); and (b) at least one electrolyte salt, 2) A solid polymer electrolyte comprising a composite of:
(a) a polymer obtained from at least one compound having alcoholic hydroxyl groups, wherein at least one hydrogen atom of the alcoholic hydroxyl groups is replaced by a unit represented by general formula (XI) below:

wherein $R^1$ represents a hydrogen or a methyl group; $R^3$ each represents $-(CH_2)_2-$, $-CH(CH_3)CH_2-$ or $-CH_2CH(CH_3)-$; x and y each represents zero or a number of between 1 and 5; z represents zero or a numerical value of between 1 and 10, provided that z is zero when both of x and y are zero; n represents an integer of one or more; wherein the unit of $[O(CH_2)_x(CH(CH_3))_y]_z$ may comprise substituents $(CH_2)$ and $(CH(CH_3))$ in various arrangements; provided that each of $R^1$, $R^3$, x, y, and z of each such unit in the compound may independently represent the above-mentioned atom, group number, or value, respectively and is not necessary to be the same as such of the other said unit in the compound and/or a copolymer comprising at least one of the above compounds as a co-monomer (hereinafter, the above polymer and copolymer will be generally referred to as "(M)ANE polymer"); and (b) at least one electrolyte salt, 3) A solid polymer electrolyte comprising a composite of:
(a) a polymer obtained from at least one compound (hereinafter, referred to as "AXE" for the compound wherein $R^1$ represents a hydrogen, and as "MXE" for the compound wherein $R^1$ represents a methyl group) represented by a general formula (IA) below:

$$CH_2=C(R^1)C(=O)[O(CH_2)_x(CH(CH_3))_y]_zNHC(=O)OR^2 \quad (IA)$$

wherein $R^1$ represents a hydrogen or a methyl group; $R^2$ represents an organic chain containing at least one oxyalkylene group and said organic chain may be linear, branched or cyclic and may contain one or more atoms other than carbon, hydrogen or oxygen; x and y each represents zero or a number of between 1 and 5; z represents zero or a numerical value of between 1 and 10, provided that z is zero when both of x and y are zero; wherein the unit of $[O(CH_2)_x(CH(CH_3))_y]_z$ may comprise substituents $(CH_2)$ and $(CH(CH_3))$ in various arrangements, and/or a copolymer comprising at least one of the above compounds as a co-monomer (hereinafter, the above polymer and copolymer will be generally referred to as "(M)AXE polymer"); and
(b) at least one electrolyte salt, 4) A solid polymer electrolyte comprising a composite of:
(a) a polymer obtained from at least one compound selected from the group consisting of 2-acryloyloxyethylcarbamic acid ester (hereinafter, referred to as "ACE") and 2-methacryloyloxyethylcarbamic acid ester (hereinafter, referred to as "MCE") represented by a general formula (IB) below:

$$CH_2=C(R^1)C(=O)O(CH_2)_2NHC(=O)OR^2 \quad (IB)$$

wherein $R^1$ represents a hydrogen or a methyl group; and $R^2$ represents an organic chain containing at least one oxyalkylene group and the organic chain may be linear, branched or cyclic and may contain one or more atoms other than carbon, hydrogen or oxygen and/or a copolymer comprising at least one of the above compounds as a co-monomer (hereinafter, the above polymer and copolymer will be generally referred to as "(M)ACE polymer"); and (b) at least one electrolyte salt, 5) A solid polymer electrolyte comprising a composite of:
(a) a polymer obtained from at least one compound represented by a general formula (IIA) below:

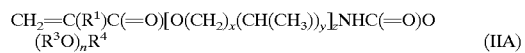

wherein $R^1$ represents a hydrogen or a methyl group; $R^3$ each independently represents $-(CH_2)_2-$ or $-CH(CH_3)CH_2-$; $R^4$ represents an alkyl group having 1 to 10 carbon atoms, $-C(=O)NH[O(CH_2)_{x'}(CH(CH_3))_{y'}]_{z'}OC(=O)CH=CH_2$, $-C(=O)NH[O(CH_2)_{x'}(CH(CH_3))_{y'}]_{z'}OC(=O)C(CH_3)=CH_2$, $-C(=O)NHC(=O)C(CH_3)=CH_2$ or $-C(=O)NHC(=O)CH=CH_2$;

n represents an integer of 1 or more; x and y each represents zero or a number of between 1 and 5; z represents zero or a numerical value of between 1 and 10, provided that z is zero when both of x and y are zero; x' and y' each represents zero or a number of between 1 and 5; z' represents zero or a numerical value of between 1 to 10, provided that z' is zero when both of x' and y' are zero; wherein the units of $[O(CH_2)_x(CH(CH_3))_y]_z$ and $[O(CH_2)_{x'}(CH(CH_3))_{y'}]_{z'}$ may comprise substituents $(CH_2)$ and $(CH(CH_3))$ in various arrangements;

or by a general formula (IIIA) below:

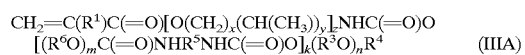

wherein $R^4$ represents an alkyl group having 1 to 10 carbon atoms, $-C(=O)NH[O(CH_2)_{x'}(CH(CH_3))_{y'}]_{z'}OC(=O)CH=CH_2$, $-C(=O)NH[O(CH_2)_{x'}(CH(CH_3))_{y'}]_{z'}OC(=O)C(CH_3)=CH_2$, $-C(=O)NHC(=O)C(CH_3)=CH_2$, $-C(=O)NHC(=O)CH=CH_2$ or $-[C(=O)NHR^5NHC(=O)(OR^6)_m]_k OC(=O)NH[O(CH_2)_{x'}(CH(CH_3))_{y'}]_{z'}OC(=O)C(R^1)=CH_2$;

$R^5$ represents an alkylene, allylene, arylene or oxyalkylene group having 1 to 20 carbon atoms; n, m and k respectively represents an integer of 1 or more;

$R^6$ each independently represents $-(CH_2)_2-$ or $-CH(CH_3)CH_2-$; and $R^1$, $R^3$, x, y, z, x', y', and z' each represents the same as above, and/or a copolymer comprising at least one of the above compounds as a co-monomer; and (b) at least one electrolyte salt.

The expression of "$R^3$ each independently represents $-(CH_2)_2-$ or $-CH(CH_3)CH_2-$" throughout the disclosure of the present invention means that each $R^3$ in n ($R^3O$) units can be selected independently from the group consisting of —($CH_2$)$_2$— and —$CH(CH_3)CH_2$—. Similarly, it applies mutatis mutandis to $R^6$.

6) A solid polymer electrolyte comprising a composite of:
  (a) a polymer obtained from at least one compound selected from the group consisting of:
    (i) 2-methacryloyloxyethylcarbamic acid ω-alkyloligooxyalkyl ester (hereinafter, referred to as "MCOA"), 2-acryloyloxyethylcarbamic acid ω-alkyloligooxyalkyl ester (hereinafter, referred to as "ACOA"), 2-methacryloyloxyethylcarbamic acid 2-methacryloyloxyethylcarbamoyloligooxyalkyl ester (hereinafter, referred to as "MCMC"), 2-acryloyloxyethylcarbamic acid 2-acryloyloxyethylcarbamoyloligooxyalkyl ester (hereinafter, referred to as "ACAC"), and 2-acryloyloxyethylcarbamic acid 2-methacryloyloxy-ethylcarbamoyloligooxyalkyl ester (hereinafter, referred to as "ACMC"), represented by a general formula (IIB) below:

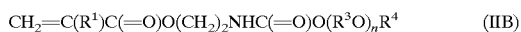

wherein $R^1$ represents a hydrogen or a methyl group; $R^3$ represents —($CH_2$)$_2$— or —$CH(CH_3)CH_2$—; $R^4$ represents an alkyl group having 1 to 10 carbon atoms, —C(=O)NH($CH_2$)$_2$OC(=O)CH=$CH_2$ or —C(=O)NH($CH_2$)$_2$OC(=O)C($CH_3$)=$CH_2$; and n is an integer of 1 or more; or
    (ii) a compound represented by general formula (IIIB) below:

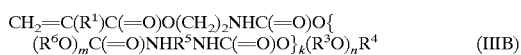

wherein $R^1$ represents a hydrogen or a methyl group; $R^3$ and $R^6$ independently represents —($CH_2$)$_2$— or —$CH(CH_3)$ $CH_2$—;
    $R^4$ represents an alkyl group having 1 to 10 carbon atoms, —C(=O)NH($CH_2$)$_2$OC(=O)CH=$CH_2$ or —C(=O)NH($CH_2$)$_2$OC(=O)C($CH_3$)=$CH_2$;
    $R^5$ represents an alkylene, allylene, arylene or oxyalkylene group having 1 to 20 carbon atoms; and n,m and k respectively represents an integer of 1 or more;
    and/or a copolymer comprising at least one of the above compounds (i) and (ii) as a co-monomer; and
  (b) at least one electrolyte salt,
7) A solid polymer electrolyte described in any of above 1) through 6), wherein the electrolyte salt is at least one compound selected from an alkali metal salt, a quaternary ammonium salt, a quaternary phosphonium salt and a transition metal salt,
8) A solid polymer electrolyte described in any of above 1) through 7), wherein the solid polymer electrolyte further contains a plasticizer,
9) A battery which comprises the solid polymer electrolyte described in any of above 1) through 8),
10) A lithium battery which comprises the negative electrode comprising lithium or lithium alloy and the solid polymer electrolyte described in any of above 1) through 8),
11) A lithium ion battery which comprises the negative electrode comprising a carbon material which can occlude and discharge lithium ion and the solid polymer electrolyte described in any of above 1) through 8),
12) A battery which comprises the positive electrode comprising an aniline-based polymer soluble in an organic solvent or other electroconductive polymer, a metal oxide, a metal sulfide or a carbon material and the solid polymer electrolyte described in any of above 1) through 8),
13) An electrode comprising a (M)AE polymer and at least one electroactive substance or polarizable material,
14) An electrode comprising a (M)ANE polymer and at least one electroactive substance or polarizable material,
15) An electrode comprising a (M)AXE polymer and at least one electroactive substance or polarizable material,
16) An electrode comprising a (M)ACE polymer and at least one electroactive substance or polarizable material,
17) An electrode comprising a polymer obtained from at least one compound selected from a compound represented by general formula (IIA) or a compound represented by general formula (IIIA) and/or a copolymer comprising at least one of the above compounds as a co-monomer and at least one electroactive substance or polarizable material,
18) An electrode comprising a polymer obtained from at least one compound selected from MCOA, ACOA, MCMC, ACAC, ACMC or a compound represented by general formula (IIIB) and/or a copolymer comprising at least one of the above compounds as a co-monomer and at least one electroactive substance or polarizable material,
19) An electrode described in any of above 13) through 18), wherein the electroactive substance or polarizable material comprises an aniline-based polymer soluble in an organic solvent or other electroconductive polymer, a metal oxide, a metal sulfide or a carbon material,
20) A process for manufacturing an electrode which comprises a step of polymerizing a polymerizable monomer mixture comprising at least one compound selected from a compound having alcoholic hydroxyl groups, at least one hydrogen atom of the alcoholic hydroxyl groups being each replaced by a unit represented by the above-mentioned general formula (X) and at least one electroactive substance or polarizable material, without or with an optionally-added plasticizer,
21) A process for manufacturing an electrode which comprises a step of polymerizing a polymerizable monomer mixture comprising at least one compound selected from a compound having alcoholic hydroxyl groups, wherein at least one hydrogen atom of the alcoholic hydroxyl groups is replaced by a unit represented by the above-mentioned general formula (XI) and at least one electroactive substance or polarizable material, without or with an optionally-added plasticizer,
22) A process for manufacturing an electrode which comprises a step of polymerizing a polymerizable monomer mixture comprising at least one compound selected from AXE and MXE and at least one electroactive substance or polarizable material, without or with an optionally-added plasticizer,
23) A process for manufacturing an electrode which comprises a-step of polymerizing a polymerizable monomer mixture comprising at least one compound selected from ACE and MCE and at least one electroactive substance or polarizable material, without or with an optionally-added plasticizer,
24) A process for manufacturing an electrode which comprises a step of polymerizing a polymerizable monomer mixture comprising at least one compound selected from a compound represented by general formula (IIA) or a compound represented by general formula (IIIA) and at least one electroactive substance or polarizable material, without or with an optionally-added plasticizer, 25) A process for manufacturing an electrode which comprises a step of polymerizing a polymerizable monomer mixture comprising at least one compound selected from MCOA, ACOA, MCMC, ACAC, ACMC or a compound represented by general formula (IIIB) and at least one electroactive substance or polarizable material, without or with an optionally-added plasticizer, 26) A process for manufacturing an electrode described in any of above 20) through 25), wherein the electroactive substance or polarizable material comprises an aniline-based polymer soluble in an organic solvent or other electroconductive polymer, a metal oxide, a metal sulfide or a carbon material, 27) A process for manufacturing a battery which comprises steps of placing a polymerizable monomer mixture in a frame for construction of a battery or on a support and polymerizing the polymerizable monomer mixture, wherein the mixture comprises at least one compound having alcoholic hydroxyl groups, wherein at least one hydrogen atom of the alcoholic hydroxyl groups is replaced by a unit represented by the above-mentioned general formula (X), at least one electrolyte salt and optionally a plasticizer, 28) A process for manufacturing a battery which comprises steps of placing a polymerizable monomer mixture in a frame for construction of a battery or on a support and polymerizing the polymerizable monomer mixture, wherein the mixture comprises at least one compound having alcoholic hydroxyl groups, wherein at least one hydrogen atom of the alcoholic hydroxyl groups is replaced by a unit represented by the above-mentioned general formula (XI), at least one electrolyte salt and optionally a plasticizer, 29) A process for manufacturing a battery which comprises steps of placing a polymerizable monomer mixture in a frame for construction of a battery or on a support, and polymerizing the polymerizable monomer mixture, wherein the mixture comprises at least one compound selected from AXE or MXE, at least one electrolyte salt and optionally a plasticizer, 30) A process for manufacturing a battery which comprises steps of placing a polymerizable monomer mixture in a frame for construction of a battery or on a support, and polymerizing the polymerizable monomer mixture, wherein the mixture comprises at least one compound selected from ACE or MCE, at least one electrolyte salt and optionally a plasticizer, 31) A process for manufacturing a battery which comprises steps of placing a polymerizable monomer mixture in a frame for construction of a battery or on a support, and polymerizing the polymerizable monomer mixture, wherein the mixture comprises at least one compound selected from a compound represented by general formula (IIA) or a compound represented by general formula (IIIA) and at least one electrolyte salt and optionally a plasticizer, 32) A process for manufacturing a battery which comprises steps of placing a polymerizable monomer mixture in a frame for construction of a battery or on a support, and polymerizing the polymerizable monomer mixture, wherein the mixture comprises at least one compound selected from MCOA, ACOA, MCMC, ACAC, ACMC or a compound represented by general formula (IIIB) and at least one electrolyte salt and optionally a plasticizer, 33) An electric double layer capacitor comprising polarizable electrodes and an ionic conducting substance arranged between the electrodes, wherein the ionic conducting substance comprises the solid polymer electrolyte described in any of above 1) through 8), 34) An electric double layer capacitor comprising polarizable electrodes and an ionic conducting substance arranged between the electrodes, wherein the polarizable electrodes comprises a carbon material and the above-mentioned (M)AE polymer, 35) An electric double layer capacitor comprising polarizable electrodes and an ionic conducting substance arranged between the electrodes, wherein the polarizable electrodes comprises a carbon material and the above-mentioned (M)ANE polymer, 36) An electric double layer capacitor comprising polarizable electrodes and an ionic conducting substance arranged between the electrodes, wherein the polarizable electrodes comprises a carbon material and the above-mentioned (M)AXE polymer, 37) An electric double layer capacitor comprising polarizable electrodes and an ionic conducting substance arranged between the electrodes, wherein the polarizable electrodes comprises a carbon material and the above-mentioned (M)ACE polymer, 38) An electric double layer capacitor comprising polarizable electrodes and an ionic conducting substance arranged between the electrodes, wherein the polarizable electrodes comprise a carbon material and a polymer obtained from at least one compound selected from a compound represented by the general formula (IIA) or a compound represented by the general formula (IIIA) and/or a copolymer comprising the above-mentioned compound as a co-monomer, 39) An electric double layer capacitor comprising polarizable electrodes and an ionic conducting substance arranged between the electrodes, wherein the polarizable electrodes comprise a carbon material and a polymer obtained from at least one compound selected from MCOA, ACOA, MCMC, ACAC, ACMC or a compound represented by the general formula (IIIB) and/or a copolymer comprising the above-mentioned compound as a co-monomer, 40) An electric double layer capacitor comprising polarizable electrodes and an ionic conducting substance arranged between the electrodes, wherein the polarizable electrodes are those manufactured by polymerizing a polymerizable monomer mixture comprising a carbon material and at least one compound selected from AXE or MXE, 41) An electric double layer capacitor comprising polarizable electrodes and an ionic conducting substance arranged between the electrodes, wherein the polarizable electrodes are those manufactured by polymerizing a polymerizable monomer mixture comprising a carbon material and at least one compound selected from ACE or MCE, 42) An electric double layer capacitor comprising polarizable electrodes and an ionic conducting substance arranged between the electrodes, wherein the polarizable electrodes are those manufactured by polymerizing a polymerizable monomer mixture comprising a carbon material and at least one compound selected from a compound represented by the general formula (IIA) or a compound represented by the general formula (IIIA), 43) An electric double layer capacitor comprising polarizable electrodes and an ionic conducting substance arranged between the electrodes, wherein the polarizable electrodes are those manufactured by polymerizing a polymerizable monomer mixture comprising a carbon material and at least one compound selected from MCOA, ACOA, MCMC, ACAC, ACMC or a compound represented by the general formula (IIIB), 44) A process for manufacturing an electric double layer capacitor which comprises steps of placing a polymerizable monomer mixture in a frame for construction of an electric double layer capacitor or on a support and polymerizing the polymerizable monomer mixture, wherein the mixture comprises at least one compound having alcoholic hydroxyl groups, wherein at least one hydrogen atom of the alcoholic hydroxyl groups is replaced by a unit represented by the above-mentioned general formula (X), at least one electrolyte salt and optionally a plasticizer.

45) A process for manufacturing an electric double layer capacitor which comprises steps of placing a polymerizable monomer mixture in a frame for construction of an electric double layer capacitor or on a support and polymerizing the polymerizable monomer mixture, wherein the mixture comprises at least one compound having alcoholic hydroxyl groups, wherein at least one hydrogen atom of the alcoholic hydroxyl groups is replaced by a unit represented by the above-mentioned general formula (XI), at least one electrolyte salt and optionally a plasticizer.

46) A process for manufacturing an electric double layer capacitor which comprises steps of placing a polymerizable monomer mixture in a frame for construction of an electric double layer capacitor or on a support, and polymerizing the polymerizable monomer mixture, wherein the mixture comprises at least one compound selected from AXE or MXE, at least one electrolyte salt and optionally a plasticizer, 47) A process for manufacturing an electric double layer capacitor which comprises steps of placing a polymerizable monomer mixture in a frame for construction of an electric double layer capacitor or on a support, and polymerizing the polymerizable monomer mixture, wherein the mixture comprises at least one compound selected from ACE or MCE, at least one electrolyte salt and optionally a plasticizer, 48) A process for manufacturing an electric double layer capacitor which comprises steps of placing a polymerizable monomer mixture in a frame for construction of an electric double layer capacitor or on a support, and polymerizing the polymerizable monomer mixture, wherein the polymerizable monomer mixture comprises at least one compound selected from a compound represented by the general formula (IIA) or a compound represented by the general formula (IIIA), at least one electrolyte salt and optionally a plasticizer, 49) A process for manufacturing an electric double layer capacitor which comprises steps of placing a polymerizable monomer mixture in a frame for construction of an electric double layer capacitor or on a support, and polymerizing the polymerizable monomer mixture, wherein the polymerizable monomer mixture comprises at least one compound selected from MCOA, ACOA, MCMC, ACAC, ACMC or a compound represented by the general formula (IIIB), at least one electrolyte salt and optionally a plasticizer, 50) A process for manufacturing an electric double layer capacitor which comprises steps of arranging a pair of polarizable electrodes comprising a carbon material and above-mentioned (M)AXE polymer so as to face each other; placing in between the facing electrodes a polymerizable monomer mixture comprising at least one compound selected from AXE or MXE, at least one electrolyte salt and optionally a plasticizer; and polymerizing the polymerizable monomer mixture, and 51) A process for manufacturing an electric double layer capacitor which comprises steps of arranging a pair of polarizable electrodes comprising a carbon material and above-mentioned (M)ACE polymer so as to face each other; placing in between the facing electrodes a polymerizable monomer mixture comprising at least one compound selected from ACE or MCE, at least one electrolyte salt and optionally a plasticizer; and polymerizing the polymerizable monomer mixture.

Thus the above-mentioned objects have been achieved by developing the above 1) to 51). The term "oligooxyalkyl" in the definitions of MCOA, ACOA, MCMC, ACAC and ACMC throughout this specification and the claims represents an oxyalkylene chain containing at least one divalent unit selected from —CH$_2$CH$_2$O—, —CH$_2$CH(CH$_3$)O— or —CH(CH$_3$)CH$_2$O—.

BRIEF DESCRIPTION OF THE DRAWING

FIG. 2 is a schematic cross-sectional view showing an example of a thin solid-state battery according to the present invention. In FIG. 2, 1 is a positive electrode, 2 is a solid polymer electrolyte, 3 is a negative electrode, 4 is a collector, 5 is a spacer and 6 is an insulating resin sealing; and FIG. 3 is a schematic cross-sectional view showing an example of a solid-state electric double layer capacitor according to the present invention, wherein a pair of polarizable electrodes 7 is arranged inside the collector 8 between which a solid polymer electrolyte film 9 is arranged. 10 is a spacer comprising an insulating film, 11 is an insulating resin sealing and 12 is a lead wire.

DETAILED DESCRIPTION OF THE INVENTION

Figure 1:
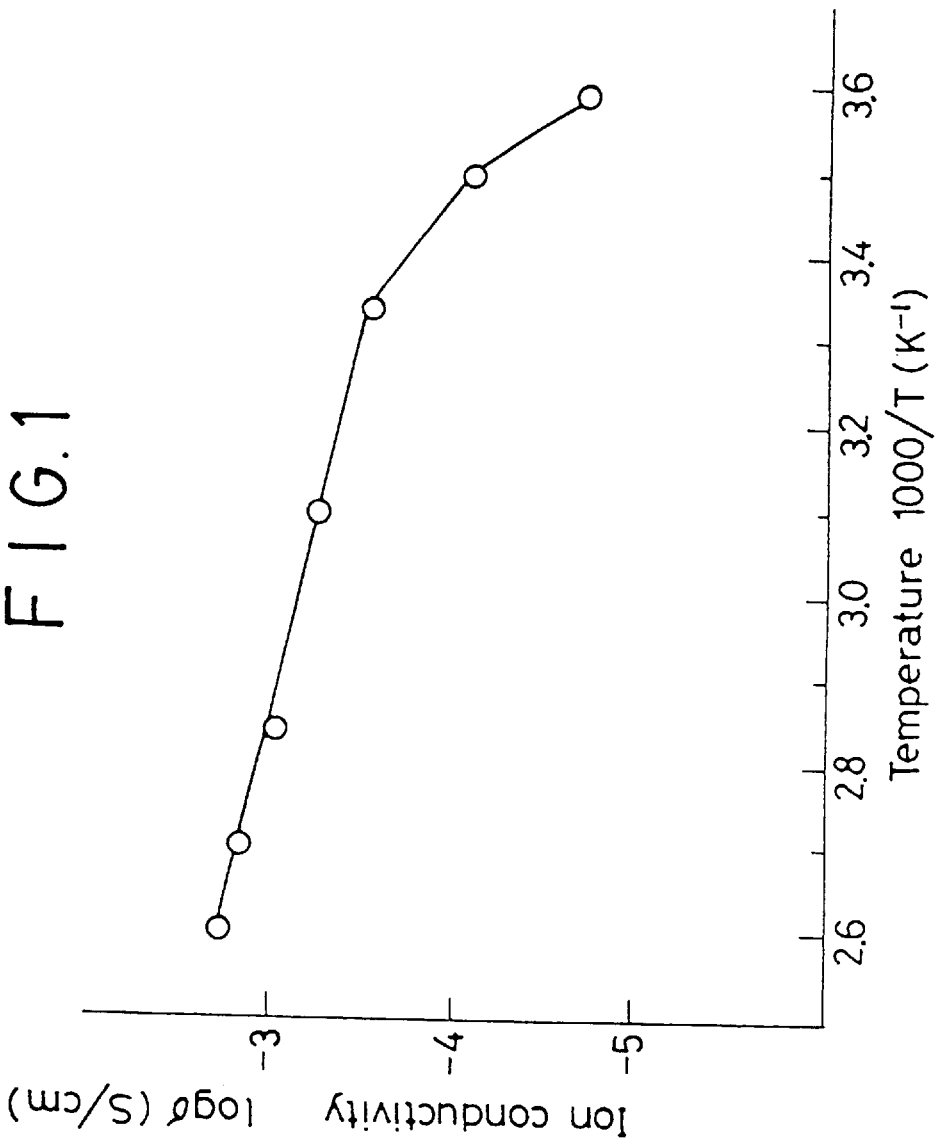
FIG. 1 is a graph illustrating the temperature dependence of ionic conductivity of the film made of a solid polymer electrolyte prepared in Example 13 of the present invention.

Hereinafter, the present invention will be described in more detail.

Examples of the compounds AXE, MXE, ACE and MCE represented by the above general formula (IA) or (IB) used in the present invention are compounds having one polymerizable group such as MCOA and ACOA, compounds having plural polymerizable groups such as MCMC, ACAC and ACMC, each represented by the above general formula (IIA) or (IIB), compounds having plural urethane groups as represented by the general formula (IIIA) or (IIIB), or compounds containing cyclic oxyalkylene groups such as compounds having a crown ether as $R^2$ in the above general formula (IA) or (IB).

ACE and MCE represented by the general formula (IB), each of which is a monomer to prepare the above-mentioned (M)ACE polymer and ACOA and MCOA represented by the general formula (IIB), can be obtained by the following reaction schemes. In the following reaction schemes, $R^1$, $R^3$, and $R^4$ each mean the same as defined in general formula (IIB).

$CH_2=C(R^1)C(=O)O(CH_2)_2NCO + HO(R^3O)_nR^4 \longrightarrow$

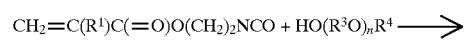

ACE (or ACOA) or MCE (or MCOA)

For example, MCOA and ACOA can be readily obtained by reacting 2-methacryloyloxyethylisocyanate (hereinafter, referred to as "MOI") or 2-acryloyloxyethylisocyanate (hereinafter, "AOI") with monoalkylalkylene glycol. MCMC, ACAC or ACMC represented by the general formula (IIB) can be readily obtained by reacting MOI and/or AOI with oligoalkylene glycol in a molar proportion of 2:1.

Similarly, AXE and MXE represented by the general formula (IA), each of which is a monomer to prepare the above-mentioned (M)AXE polymer and the compound represented by the general formula (IIA), can be obtained by the following reaction schemes. In the following reaction schemes, $R^1$, $R^3$, and $R^4$ each mean the same as defined in general formula (IIA).

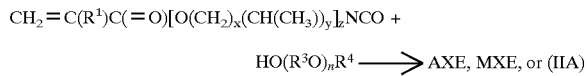

The compounds having plural urethane groups represented by the general formula (IIIB) can also be obtained, for example, by reacting k mole of a compound having two isocyanate groups, such as hexamethylenediisocyanate and tolylenediisocyanate, with (2k-j) mole of alkylene glycol and j mole of monoalkylalkylene glycol to obtain j mole of product and then reacting the thus obtained product with the same mole of the above MOI or AOI according to the following two reaction schemes. In the following reaction schemes, $R^3$, $R^4$, $R^5$, $R^6$, k, m and n each mean the same as defined in general formula (IIIB) and each of j and (2k-j) is a positive number.

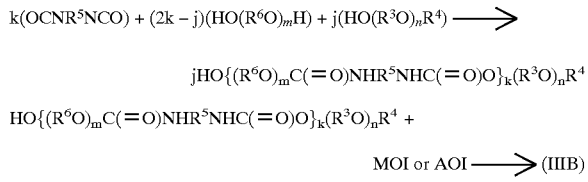

In the specification the term "alkylene glycol" includes oligoalkylene glycol and polyalkylene glycol and the term "monoalkylalkylene glycol" includes monoalkyloligoalkylene glyocol and monoalkylpolyalkylene glycol.

In the same way, compounds having plural urethane groups represented by general formula (IIIA) can be obtained according to the following two reaction schemes. In the following reaction schemes, $R^3$, $R^4$, $R^5$, $R^6$, k, m, and n each means the same as defined in general formula (IIIA) and each of a and b is a positive number wherein a and b are numbers which satisfy the conditions: a ≧ b and a/b=k.

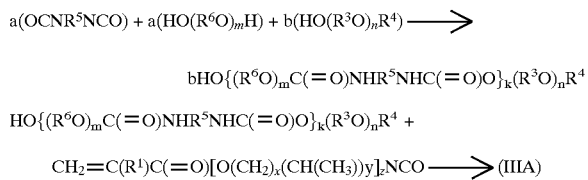

The compounds represented by general formula (IIIA) can also be obtained, for example, by reacting c mole of a compound having two isocyanate groups with (c+d) mole of alkylene glycol to obtain d mole of product and then reacting the thus obtained product with twice mole of the compound represented by general formula:

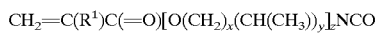

according to the following two reaction schemes:

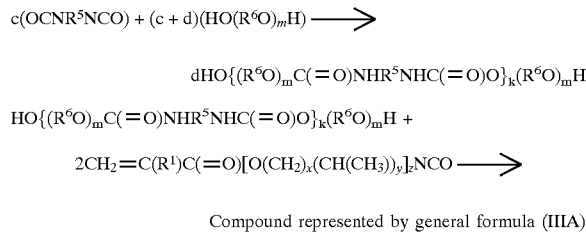

Compound represented by general formula (IIIA)

wherein c and d are numbers which satisfy the conditions: c≧d and c/d=k.

A compound having alcoholic hydroxyl groups, wherein at least one hydrogen atom of the alcoholic hydroxyl groups is replaced by a unit represented by general formula (X) or (XI), is used as a monomer for preparing the solid polymer electrolyte of the present invention. Such a compound can be obtained, for example, by reacting $CH_2=C(R^1)CO[O(CH_2)_x(CH(CH_3))_y]_zNCO$, wherein $R^1$, X, y and z each mean the same as defined in general formula (X), with a compound having alcoholic hydroxyl groups and an oxyalkyl group.

The hydrogen atom of the alcoholic hydroxyl group, which is not replaced by a unit represented by the aforementioned general formula (X) or (XI), in the compound as used in the present invention may preferably be replaced by an organic chain such as an alkyl group, or an alkyl group containing at least one oxyalkylene group and the organic chain may be a linear, branched or cyclic saturated or unsaturated organic chain and may contain one or more atoms other than carbon, hydrogen or oxygen. Such organic chains, for example, include a $C_1$~$C_{20}$ linear or branched, saturated or unsaturated alkyl or alicyclic group, methoxymethyl, methoxyethyl, ethoxyethyl, propoxypropyl, or other alkoxy-oligoalkyleneoxyalkyl group, phenyl group, and $C_1$~$C_{20}$-alkyl-substituted phenyl group.

Specifically, a compound having at least two alcoholic hydroxyl groups, wherein one hydrogen atom of the alcoholic hydroxyl groups is replaced by a unit represented by general formula (X) or (XI), can be readily obtained, for example, by reacting a methacryloylisocyanate compound (hereinafter referred to as "MI") or acryloylisocyanate compound (hereinafter referred to as "AI") with a monoalkyloligoalkyleneglycol at a molar ratio of 1:1.

A compound having at least two alcoholic hydroxyl groups, wherein two hydrogen atoms of the alcoholic hydroxyl groups are replaced by a unit represented by general formula (X) or (XI), can be readily obtained, for example, by reacting MI or AI with an oligoalkyleneglycol at a molar ratio of 2:1.

A compound having at least three alcoholic hydroxyl groups, wherein two hydrogen atoms of the alcoholic hydroxyl groups are replaced by a unit represented by general formula (X) or (XI), can be readily obtained, for example, by reacting two moles of MI or AI with one mole of a diol which is prepared by capping with a methoxy group one of three hydroxyl groups of a triol, obtained by the addition reaction of glycerin with alkyleneoxide.

A compound having at least three alcoholic hydroxyl groups, wherein three hydrogen atoms of the alcoholic hydroxyl groups are replaced by a unit represented by general formula (X) or (XI), can be readily obtained, for example, by reacting three moles of MI or AI with one mole of a triol which is obtained by the addition reaction of a triol, such as glycerin with alkyleneoxide.

A compound having at least four alcoholic hydroxyl groups, wherein four hydrogen atoms of the alcoholic hydroxyl groups are replaced by a unit represented by general formula (X) or (XI), can be readily obtained, for example, by reacting four moles of MI or AI with one mole of a tetraol which is obtained by the addition reaction of a tetraol, such as pentaerythritol with alkyleneoxide.

A compound having at least five alcoholic hydroxyl groups, wherein five hydrogen atoms of the alcoholic hydroxyl groups are replaced by a unit represented by general formula (X) or (XI), can be readily obtained, for example, by reacting five moles of MI or AI with one mole of a pentaol which is obtained by the addition reaction of α-D-glucopyranose with alkyleneoxide.

A compound having at least six alcoholic hydroxyl groups, wherein six hydrogen atoms of the alcoholic hydroxyl groups are replaced by a unit represented by general formula (X) or (XI), can be readily obtained, for example, by reacting six moles of MI or AI with one mole of a hexaol which is obtained by the addition reaction of mannitol with alkyleneoxide.

Among the compounds represented by general formula (IA) or (IB), compounds represented by general formula (IIA) or (IIB) are preferred since they enable more urethane groups and oxyalkylene groups to be introduced in the side chain of the obtained polymer.

Among the compounds having an alcoholic hydroxyl group, at least one hydrogen atom of the groups being replaced by a unit represented by general formula (XI) are preferred since they enable more urethane groups and oxyalkylene groups to be introduced in the side chain of the obtained polymer.

The above-mentioned (M)AXE polymer comprised by the solid polymer electrolyte of the present invention can be obtained by polymerizing at least one compound selected from AXE or MXE represented by general formula (IA) or performing polymerization using such a compound as a co-monomer.

The above-mentioned (M)ACE polymer comprised by the solid polymer electrolyte of the present invention can be obtained by polymerizing at least one compound selected from ACE or MCE represented by general formula (IB) or performing polymerization using such a compound as a co-monomer.

General methods which utilize polymerizability of the acryloyl or methacryloyl group in these monomers can be adopted for polymerization. For example, at least one compound selected from these monomers, or such monomers and other polymerizable compounds, such as a methacrylic acid (or acrylic acid) esters, acrylamide, N-vinylacetamide, and styrene, are mixed together, and are then radically, anionically or cationically polymerized using a radical polymerization catalyst such as azobisisobutyronitrile and benzoyl peroxide, a cation polymerization catalyst, such as a protonic acid such as $CF_3COOH$, Lewis acids such as $BF_3$ and $AlCl_3$, or an anion polymerization catalyst such as butyllithium, sodium naphthalene, and lithium alkoxide. Polymerization can also be performed after forming the polymerizable monomer mixture into a shaped article, such as a film. In the case where a (M)AXE polymer or a (M)ACE polymer is used in a solid polymer electrolyte as in the present invention, it is particularly advantageous to polymerize such a polymerizable monomer mixture after film formation.

At least one compound selected from AXE, MXE, ACE or MCE, for example, MCOA, ACOA, MCMC, ACAC and ACMC and at least one electrolyte salt such as an alkali metal salt, a quaternary ammonium salt, a quaternary phosphonium salt or a transition metal salt, with or without optionally adding thereto (i) another polymerizable compound and/or (ii) a plasticizer and/or (iii) a solvent; are mixed together, and then the resulting polymerizable monomer mixture is polymerized in the presence of or in the absence of such a catalyst as described above, optionally with heat and/or electromagnetic radiation such as light, to form a polymer.

A wider freedom in processing can be obtained which gives a great advantage over the prior art by employing such a process as those comprising; forming the polymerizable monomer mixture into a shaped article, such as a film, plate, disk or fiber, and then polymerizing the same, for example, with heat and/or electromagnetic radiation such as light, to give a polymer film.

Any solvent that does not hinder the polymerization may be used, depending on the kind of compound represented by general formula (IA) or (IB) and the presence of a catalyst. An example of the usable solvent includes tetrahydrofuran, acetonitrile, and toluene.

The temperature for heat polymerization may vary as long as this polymerization reaction occurs. It depends on the kind of compound represented by general formula (IA) or (IB) and usually a temperature of 0° to 200° C. is sufficient. Although polymerization conditions with electromagnetic radiation may vary depending on the kind of compound represented by general formula (IA) or (IB), it is possible to perform polymerization with ultraviolet rays or γ rays of at least several mW using an initiator, such as benzylmethylketal or benzophenone.

A (M)AXE polymer used in a solid polymer electrolyte of the present invention may be, as mentioned above, a homopolymer of AXE or MXE represented by general formula (IA), a copolymer comprising at least two compounds selected from AXE and/or MXE, or a copolymer comprising at least one compound selected from AXE and MXE and another polymerizable compound.

A (M)ACE polymer used in a solid polymer electrolyte of the present invention may be, as mentioned above, a homopolymer of ACE or MCE represented by general formula (IB), a copolymer comprising at least two compounds selected from ACE and/or MCE, or a copolymer comprising at least one compound selected from ACE and MCE and another polymerizable compound. The polymer to be used in a solid polymer electrolyte of the present invention may be also a mixture of such a (M)AXE polymer or a (M)ACE polymer, and other polymers. For example, a mixture of a (M)AXE polymer or a (M)ACE polymer, and a polymer such as polyethylene oxide, polyacryronitrile, polybutadiene, polymethacrylic (or polyacrylic) acid esters, polyphosphazenes, polysiloxanes, polysilanes or polystyrene can be used in a solid polymer electrolyte of the present invention. The amount of structural units derived from AXE, MXE, ACE or MCE represented by the general formula (IA) or (IB) in the above polymer or polymer mixture is preferably not lower than 20% by weight, which is a sufficient value for the polymer to exhibit characteristics of the urethane bond contained therein, while not lower than 50% by weight is more preferred.

The molecular weight of the (M)AXE polymer or the (M)ACE polymer used in the solid polymer electrolyte of the present invention is preferably not lower than 1,000, but not higher than 1,000,000, and more preferably not lower than 5,000, but not higher than 50,000. If the molecular weight of the polymer increases, the film properties, such as the film strength after processing, are improved, while in contrast the thermal motion, which is important to carrier ion migration, is restricted, thereby decreasing the other hand, too low a molecular weight deteriorates film formability and film strength so that the resulting film has poor fundamental physical properties.

Of the monomers represented by general formulae (IA), (IIA) and (IIIA) used for preparing the (M)AXE polymer used in the solid polymer electrolyte of the present invention, compounds having one polymerizable group give rise to comb-shaped polymers, while compounds having two polymerizable groups give rise to network-form polymers. Therefore, polymers which exhibit high thermal mobilities and have good film strength can be obtained by appropriately mixing these monomers. The number of oxyalkylene units in an oxyalkyl group which constitutes a side chain of the polymer, i.e. the number of oxyalkylene units contained in $R^2$ and $[O(CH_2)_x(CH(CH_3))_y]_z$ of the above general formula (IA), or, for example, the number of oxyalkylene units contained in $(R^3O)_n$ and $[O(CH_2)_x(CH(CH_3))_y]_z$ of the above general formula (IIA), or $(R^3O)_n$, $[(R^6O)_mC(=O)NHR^5NHC(=O)O]_k$ and $[O(CH_2)_x(CH(CH_3))_y]_z$ of the above general formula (IIIA), is preferably within the range of 1 to 1,000, and more preferably 5 to 50.

Of the monomers used for preparing the (M)ACE polymer used in the solid polymer electrolyte of the present invention, MCOA and ACOA give rise to comb-shaped polymers since each of them has one polymerizable group while MCMC, ACAC and ACMC give rise to network-form polymers, since each of them has two polymerizable groups. Therefore, polymers which exhibit high thermal mobilities and have good film strength can be obtained by appropriately mixing these monomers. The number of oxyalkylene units in an oxyalkyl group which constitutes a side chain of the polymer, i.e., the number of oxyalkylene units contained in $R^2$ of the above general formula (IB) or, for example, the value of n in the above general formula (IIB), or the value of m×k+n in the above general formula (IIIB), is preferably within the range of 1 to 1,000, and more preferably 5 to 50.

The compounds AXE and MXE of the present invention represented by general formula (IA):

$$CH_2=C(R^1)C(=O)[O(CH_2)_x(CH(CH_3))_y]_zNHC(=O)OR^2 \quad (IA)$$

that satisfies the following condition (a):

(a) x is 0–2, y is 0 or 1 and z is 0 or 1 (z is 0 when x is 0 and y is 0)

have advantages in that the corresponding isocyanates (starting materials):

$$CH_2=C(R^1)C(=O)[O(CH_2)_x(CH(CH_3))_y]_zNCO$$

usable for preparing these compounds are highly reactive and ready to react with various kinds of oxyalkylene compounds and also that they are a liquid having low viscosity, which is convenient for the reaction in a liquid system.

The compounds AXE and MXE represented by the general formula (IA): that satisfies the following conditions:

(b) x is 3–5, y is 0 and z is 1 to 10;

(c) x is 1–5, y is 1 to 5 (random arrangement) and z is 1 to 10; or (d) x is 0, y is 1 to 5 and z is 1 to 10 have high melting points and low polymerizability so that they have good storage stability and are good in handling as a polymerizable monomer.

Although, in the cases of (c) and (d), introduction of an oxypropylene group gives rise to the compound AXE and MXE which have a lower dielectric constant than that of a compound having an oxyethylene group, such compounds are very useful for some applications since their melting point and viscosity do not increase much as their molecular weight increases. Accordingly, solid polymer electrolytes having desired properties suitable for specific applications can be prepared by suitably using these polymerizable monomers (AXE and/or MXE) in combination with each other or using these monomers along with other polymerizable monomers or polymers, making use of the variety of properties of these AXE and MXE compounds.

The polymer used in the solid polymer electrolyte of the present invention can be obtained by polymerizing at least one compound having alcoholic hydroxyl groups wherein at least one hydrogen atom of the alcoholic hydroxyl groups is replaced by a unit represented by general formula (X) or (XI) or copolymerizing using such a compound as a comonomer. The thus obtained polymer is referred to as (M)AE or (M)ANE polymer, as mentioned above.

Compounds which are used in the copolymerization reaction with a compound having alcoholic hydroxyl groups, wherein at least one hydrogen atom of the alcoholic hydroxyl groups is replaced by a unit represented by general formula (X) or (XI) are not limited. Examples of such compounds include compounds which have one unit represented by general formula (X) per molecule and do not have any ethylenically unsaturated group in the rest of the molecule (hereinafter referred to as monofunctional urethane (meth)acrylate having oxyalkylene chain) such as N-methacryloylcarbamic acid ω-methyloligooxyethyl ester, and methacryloyloxyethylcarbamic acid ω-methyloligooxyethyl ester; monofunctional (meth)acrylesters having oxyalkylene chain such as methacrylic acid ω-methyloligooxyethyl ester; (meth)acrylic acid esters such as methyl methacrylate, n-butyl acrylate; (meth)acrylamides such as acrylamide, methacrylamide, N,N-dimethylacrylamide, N,N-dimethylmethacrylamide, acryloyl morpholine, methacryloyl morpholine, and N,N-dimethylaminopropyl(meth)acrylamide; styrene compounds such as styrene, α-methyl-styrene; N-vinylamides such N-vinylacetamide, and N-vinylformamide; alkylvinylethers such as ethylvinylether. Among these compounds, monofunctional urethane(meth)acrylate having an oxyalkylene chain, monofunctional (meth)acrylesters having an oxyalkylene chain and (meth)acrylamides are preferably used. Most preferred is monofunctional urethane(meth)acrylate having an oxyalkylene chain since such a compound can introduce more urethane or oxyalkylene groups into the polymer.

General methods which utilize polymerization properties of the acryloyl or methacryloyl group in these monomers can be adopted for polymerization. That is, at least one compound selected from these monomers, or a mixture of these monomers and such other polymerizable compounds as mentioned above are radically, anionically or cationically polymerized using a radical polymerization catalyst, such as azobisisobutyronitrile and benzoyl peroxide, a cation polymerization catalyst such as a protonic acid such as $CF_3COOH$, Lewis acids such as $BF_3$ and $Alcl_3$, or an anion polymerization catalyst such as butyllithium, sodium naphthalene, and lithium alkoxide.

Polymerization can also be performed after forming the polymerizable monomer mixture into a shaped article such as a film, plate, disk, or fiber. In the case where a polymer obtained from at least one compound having alcoholic hydroxyl groups, wherein at least one hydrogen atom of the alcoholic hydroxyl groups is replaced by a unit represented by general formula (X) or (XI) and/or a copolymer containing at least one of such compounds as a comonomer, is used as a solid polymer electrolyte as in the present invention, it is particularly advantageous to polymerize such a polymerizable monomer mixture after film formation.

That is, at least one of such compounds having alcoholic hydroxyl groups, wherein at least one hydrogen atom of the alcoholic hydroxyl groups is replaced by a unit represented by general formula (X) or (XI) and at least one electrolyte salt such as an alkali metal salt, a quaternary ammonium salt, a quaternary phosphonium salt or a transition metal salt, with or without optionally adding thereto (i) another polymerizable compound and/or (ii) a plasticizer and/or (iii) a solvent; are mixed together, and then the resulting polymerizable monomer mixture is polymerized in the presence of or in the absence of such a catalyst as described above, optionally with heat and/or electromagnetic radiation such as light, to form a polymer. A wider freedom in processing can be obtained which gives a great advantage over the prior art by employing such a process as those comprising forming the polymerizable monomer mixture into a shaped article such as film, plate, disk or fiber and then polymerizing the same, for example, with heat and/or electromagnetic radiation such as light, to give a polymer film.

Any solvent that does not hinder the polymerization may be used, depending on the kind of mono mer and the pre sence of a catalyst. An example of the usable solvent includes tetrahydrofuran, acetonitrile, and toluene.

The temperature f or heat polymerization may vary as long as the polymerization reaction occurs. It depends on the kind of compound having alcoholic hydroxyl groups, wherein at least one hydrogen atom of the alcoholic hydroxyl groups is replaced by a unit represented by general formula (X) or (XI) and usually a temperature of 0 to 200° C. is sufficient. Though the conditions of polymerization with electromagnetic radiation may vary depending on the kind of compound having alcoholic hydroxyl groups, wherein at least one hydrogen atom of the alcoholic hydroxyl groups is replaced by a unit represented by general formula (X) or (XI), it is possible to perform polymerization with ultraviolet rays or γ rays of at least several mW using an initiator, such as benzylmethylketal or benzophenone.

A (M)AE or (M)ANE polymer used in a solid polymer electrolyte of the present invention may be, as mentioned above, a homopolymer of the compound having alcoholic hydroxyl groups, wherein at least one hydrogen atom of the alcoholic hydroxyl groups is replaced by a unit represented by general formula (X) or (XI), a copolymer comprising at least two compounds selected from said compounds, or a copolymer comprising at least one compound selected from said compounds and another polymerizable compound.

The polymer to be used in a solid polymer electrolyte of the present invention may also be a mixture of such a polymer obtained from the compound having alcoholic hydroxyl groups, wherein at least one hydrogen atom of the alcoholic hydroxyl groups is replaced by a unit represented by general formula (X) or (XI) and other polymer(s), and/or a mixture of a copolymer containing such a compound as a co-monomer and other polymer(s). For example, a mixture of such a polymer obtained from the compound having alcoholic hydroxyl groups, wherein at least one hydrogen atom of the alcoholic hydroxyl groups is replaced by a unit represented by general formula (X) or (XI) and/or a copolymer containing such a compound as a comonomer and a polymer, such as polyethylene oxide, polyacryronitrile, polybutadiene, polymethacrylic (or polyacrylic) acid esters, polystyrene, polyphosphazenes, polysiloxanes or polysilanes, can be used in a solid polymer electrolyte of the present invention.

The amount of structural units derived from the compound having alcoholic hydroxyl groups, wherein at least one hydrogen atom of the alcoholic hydroxyl groups is replaced by a unit represented by general formula (X) or (XI) in the above (M)AE or (M)ANE polymer may vary depending upon the other comonomer contained in the copolymer or the other polymer present in the mixture, but when the polymer does not contain monofunctional urethane (meth)acrylate having an oxyalkylene chain as a comonomer, the amount is preferably not lower than 20% by weight, with not lower than 50% by weight being more preferred, in consideration of the ionic conductivity and film strength exhibited by the polymer in the solid polymer electrolyte.

The compound having alcoholic hydroxyl groups, wherein at least two hydrogen atoms of the alcoholic hydroxyl groups are replaced by a unit represented by general formula (X) or (XI) used for preparing the (M)AE or (M)ANE polymer used in the solid polymer electrolyte of the present invention has two or more ethylenically unsaturated groups and gives rise to network-form polymers when polymerized. Therefore, when such a compound (monomer) is mixed and polymerized with a compound having one unit represented by general formula (X) or (XI) per molecule, polymers which exhibit high thermal mobilities and have good film strength can be obtained. The number of oxyalkylene units in an oxyalkyl group which constitutes a side chain of the polymer, i.e., the number of oxyalkylene units contained in $R^2$ of the above general formula (X), or, for example, the value of n in the above general formula (XI) is preferably within the range of 1 to 1,000, and more preferably 5 to 50.

An organic compound may preferably be added as a plasticizer in the solid polymer electrolyte of the present invention, which increases the ionic conductivity of the electrolyte. As the organic compound to be added, those compounds are suitable that have good compatibility with the (M)AXE polymer, (M)ACE polymer, (M)AE polymer or (M)ANE polymer, have a high dielectric constant, have a boiling point of not lower than 100° C. and have a wide range of electrochemical stability. Examples of the plasticizer include oligoethers, such as triethylene glycol dimethyl ether and tetraethylene glycol dimethyl ether; carbonates such as ethylene carbonate, propylene carbonate, diethyl carbonate and vinylene carbonate; aromatic nitriles such as benzonitrile and tolunitrile, dimethylformamide, dimethylsulfoxide, N-methylpyrrolidone and N-vinylpyrrolidone; sulfur compounds such as sulfolane; and phosphoric acid esters. Among these, oligoethers and carbonates are preferred, with carbonates being particularly preferred. Thus the term "plasticizer" as described in this specification and the claims does not necessarily mean the material which is generally added to the other material to improve the plasticity of the latter.

The more the plasticizer that is added, the higher the ionic conductivity of the solid polymer electrolyte. However, if the amount of plasticizer is too much, the mechanical strength of the solid polymer electrolyte decreases. A preferred amount of the plasticizer to be added is at most 5 times as much as the weight of the (M)AXE polymer, the (M)ACE polymer, the (M)AE polymer or the (M)ANE polymer. The addition amount can be increased without decreasing the mechanical strength of the solid polymer electrolyte while improving the ionic conductivity by effecting copolymerization of AXE, MXE, ACE or MCE with polymerizable compounds such as vinylene carbonate and N-vinylpyrrolidone in appropriate combination with a non-polymerizable plasticizer.

The proportion of the electrolyte salt to be compounded with the (M)AXE polymer, the (M)ACE polymer, the (M)AE polymer or the (M)ANE polymer in the solid polymer electrolyte of the present invention is preferably 1 molecule of electrolyte salt to 2 to 100 ether oxygen atoms in the side chain. If the electrolyte salt to be compounded exists in a proportion of not below ½ molecule with respect to an ether oxygen atom, migration of ions is significantly inhibited. On the other hand, the proportion of the electrolyte salt not above 1/100 molecule is undesirable since the absolute amount of ions is insufficient and decrease the ionic conductivity.

The above compound ratio of the electrolyte salt is more preferably 1 molecule of electrolyte salt to 4 to 100 ether oxygen atoms in the side chain. If the electrolyte salt to be compounded exists in a proportion of not below than ¼ molecule with respect to an ether oxygen atom, migration of ions is inhibited. On the other hand, the p roportio n of the electrolyte salt not above 1/100 molecule is undesirable since the absolute amount of ions is insufficient and decreases the ionic conductivity.

The kind of electrolyte salt used for compounding is not particularly limited, and any electrolyte salt which contains the ion desired to be used as the carrier in the solid polymer electrolyte can be used. However, it is desirable for the dissociation constant of the electrolyte salt in the solid polymer electrolyte salt to be large, and, in this respect, recommended electrolyte salts are alkali metal salts, quaternary ammonium salts such as $(CH_3)_4NBF_4$, quaternary phosphonium salts such as $(CH_3)_4PBF_4$, transition metal salts such as $AgClO_4$, or protonic acids such as hydrochloric acid, perchloric acid, and tetrafluoroboric acid.

As the electroactive substance for negative electrode used in the battery of the present invention, preferred are, as discussed later in this specification, those in which alkali metal ions function as the carrier and have low redox potential such as alkali metals, alkali metal alloys, and carbon materials, since high voltage, high capacity batteries can be obtained when they are used. Therefore, when applied to the batteries comprising such a negative electrode and the carrier of alkali metal ions, alkali metal salts are required as the electrolyte salt in the solid polymer electrolyte. Examples of the alkali metal salt includes, for example, $LiCF_3SO_3$, $LiPF_6$, $LiClO_4$, LiI, $LiBF_4$, LiSCN, $LiAsF_6$, $NaCF_3SO_3$, $NaPF_6$, $NaClO_4$, NaI, $NaBF_4$, $NaAsF_6$, $KCF_3SO_3$, $KPF_6$, and KI. Among them, the most preferred alkali metal is lithium or a lithium alloy since when it is used, there can be obtained a battery which has a high voltage and a high capacity and which can be formed into a thin film, plate or disk. In the case of a negative electrode comprising a carbon material, there can be used not only alkali metal ions but also quaternary ammonium salts, quaternary phosphonium salts, transition metal salts, and various protonic acids.

In the case of a solid-state electric double layer capacitor, the kind of the electrolyte salt to be used for compounding therein is not particularly limited, and it is sufficient to use a compound which contains the ion desired to be used as the electric carrier. However, it is desirable for the compound to contain ions which have a large dissociation constant in the solid polymer electrolyte salt and which readily form an electric double layer together with a polarizable electrode. Examples of such a compound are quaternary ammonium salts such as $(CH_3)_4NBF_4$, $(CH_3CH_2)_4NClO_4$, transition metal salts such as $AgClO_4$, quaternary phosphonium salts such as $(CH_3)_4PBF_4$, alkali metal salts such as $LiCF_3SO_3$, $LiPF_6$, $LiClO_4$, LiI, $LiBF_4$, LiSCN, $LiAsF_6$, $NaCF_3SO_3$, $NaPF_6$, $NaClO_4$, NaI, $NaBF_4$, $NaAsF_6$, $KCF_3SO_3$, $KPF_6$, and KI, organic acids such as p-toluenesulfonic acid and salts thereof, and inorganic acids such as hydrochloric acid, and sulfuric acid. Among them, quaternary ammonium salts, quaternary phosphonium salts and alkali metal salts are preferred in view of higher output voltage and larger dissociation constant. Among the quaternary ammonium salts, those having different substituent groups on the nitrogen in the ammonium ion such as $(CH_3CH_2)(CH_3CH_2CH_2CH_2)_3NBF_4$ are preferred in view of higher solubility in the compounding polymer and larger dissociation constant.

In the frame for construction of a battery of the present invention, it is desirable to use, as the negative electrode, an electroactive substance (negative electrode material) having a low redox potential such as alkali metal, alkali metal alloy, and carbon materials in which alkali metal ions function as the carrier, since a high voltage and high capacity battery can be obtained. Among these electroactive substances, lithium metal or lithium alloys such as lithium/aluminum alloy, lithium/lead alloy, and lithium/antimony alloy, are particularly preferred since they have the lowest redox potentials. Carbon materials are also particularly preferred because they have low redox potential when they occlude Li ion and they are stable and safe. Examples of carbon materials which can occlude and discharge Li ion are natural graphite, synthesized graphite, carbon produced by vapor phase process, graphitized carbon produced therefrom, petroleum cokes, coal cokes, pitch carbon, polyacenes, fullerenes such as $C_{60}$ and $C_{70}$.

In the frame for construction of a battery of the present invention, it is desirable to use, as the positive electrode, electroactive substance (positive electrode material) having a high redox potential such as metal oxides, metal sulfides, electroconductive polymers, or carbon materials, since a high voltage, high capacity battery can be obtained. Among these electroactive substances, metal oxides such as cobalt oxide, manganese oxide, vanadium oxide, nickel oxide, and molybdenum oxide; metal sulfides such as molybdenum sulfide, titanium sulfide, and vanadium sulfide, are preferred in view of their higher packing density and higher volumetric capacity in such an electroactive substance, and particularly preferred are manganese oxide, nickel oxide, and cobalt oxide in view of their high voltage and high capacity. Electroconductive polymers such as polyaniline is particularly preferred in view of flexibility and ease of making a thin film, plate, disk or fiber. Examples of such electroconductive polymers are aniline-based polymers, polyacetylene and its derivatives, poly(p-phenylene) and its derivatives, polypyrrole and its derivatives, polythienylene and its derivatives, polypyridinediyl and its derivatives, polyisothianaphthenylene and its derivatives, polyfurylene and its derivatives, polyselenophenylene and its derivatives, polyarylenevinylene and its derivatives such as poly(p-phenylenevinylene), polythienylenevinylene, polyfurylenevinylene, polynaphthylenevinylene, polyselenophenylenevinylene, and polypyridinediylvinylene.

Examples of carbon materials include natural graphite, synthesized graphite, carbon produced by vapor phase process, graphitized carbon produced therefrom, petroleum cokes, coal cokes, fluorinated graphite, pitch carbon, polyacenes, fullerenes such as $C_{60}$ and $C_{70}$.

The process for preparing metal oxides or metal sulfides is not particularly limited and they may be prepared by conventional electrolysis process or heat process as described in "Denkikagaku", Vol. 22, page 574 (1954). When they are used as the electroactive substance in lithium batteries, it is preferred to make lithium atoms, in such a form as $Li_xCoO_2$, and $Li_xMnO_2$, inserted in or compounded with metal oxide or metal sulfide in the manufacturing process of batteries. The process for inserting Li atoms is not particularly limited and such an insertion may be performed by electrochemically inserting Li ions or by such a process as described in U.S. Pat. No. 4,357,215, in which a salt like $Li_2CO_3$ is mixed with a metal oxide and then treated with heat.

Electroconductive polymers used for electroactive substances in batteries or electrodes of the present invention are prepared by such chemical or electrochemical processes as described below or any other conventional process.

Carbon materials used for electroactive substances in batteries or electrodes of the present invention may be those commercially available or prepared by any conventional process.

An organic solvent-soluble aniline-based polymer may be used as the electroactive substance of the battery or electrode of the present invention, which is advantageous in that molding can be performed by solution coating and especially advantageous in the fabrication of thin film batteries. Examples of the aniline-based polymers include polyaniline, poly-o-toluidine, poly-m-toluidine, poly-o-anisidine, poly-m-anisidine, polyxylidines, poly-2,5-dimethoxyaniline, poly-2,6-dimethoxyaniline, poly-2,5-diethoxyaniline, poly-2,6-diethoxyaniline, poly-o-ethoxyaniline, poly-m-ethoxyaniline, and copolymers comprising such a monomeric unit as contained in these polymers. However, the present invention is not limited thereto and any polymer containing a repeating unit derived from aniline or its derivatives can be used. The larger the amount of the side chain of the organic solvent-soluble aniline-based polymer, the more convenient in view of higher solubility while as the amount of the side chain increases, but there appears an adverse effect that the gravimetric capacity of the positive electrode gets smaller. Therefore, examples of preferred aniline-based polymers include polyaniline, poly-o-toluidine, poly-m-toluidine, poly-o-anisidine, poly-m-anisidine, and polyxylidines.

While the polymerization method for producing polyaniline or its derivatives is not particularly limited, generally a method is used in which an aniline or aniline derivative such as o-anisidine is subjected to oxidative polymerization electrochemically or chemically, as reported by, for example, A. G. MacDiarmid, et al., *Journal of Chemical Society*, Chemical Communication, page 1784 (1987).

The electrochemical oxidative polymerization is performed by anodic oxidation, and a constant current method, a constant voltage method, or any other method may be used within the ranges of a current density of about 0.01 to 50 mA/cm$^2$, and an electrolytic voltage of 0.1 to 30 V. Polymerization is performed in an aqueous solution, or using an organic solvent or a mixed solvent consisting of these. The pH of the electrolytic solution is not particularly limited. However, the pH is preferably not higher than 3, and more preferably not higher than 2. Specific examples of the acid used for adjusting the pH include strong acids such as HCl, $HBF_4$, $CF_3COOH$, $H_2SO_4$, $HNO_3$, and p-toluenesulfonic acid. However, the present invention is not limited thereto.

In the case of chemical oxidative polymerization, aniline or an aniline derivative, for example, is oxidatively polymerized in an acidic solution in the presence of an oxidizing agent such as peroxide or persulfate. The same acids can be used as in the case of electrochemical oxidative polymerization. However, the acid used for polymerization of the present invention is not limited thereto, either.

The molecular weight of the thus obtained aniline-based polymer used in the present invention is not particularly limited, but usually an aniline-based polymer having a molecular weight of at least 2,000 is preferred.

Also, the aniline-based polymer obtained in such a manner as above mostly contains the anions, as a dopant, which are present in the polymerization solution. This is disadvantageous in view of the solubility and gravimetric capacity of the polymer. Therefore, it is preferred to undope the anions and further convert the aniline-based polymer into the reduced type before it is processed into an electrode, for example, by the film-, plate-, or disk-forming method. While there is no particular limitation in the method of undoping, usually a method is used in which the aniline-based polymer is treated with a base such as aqueous ammonia or sodium hydroxide. Also, there is no particular limitation in the manner of reduction. It is sufficient to perform common chemical or electrochemical reduction. For example, chemical reduction can be performed readily by dipping or stirring the aniline-based polymer treated with a base (i.e. the undoped aniline-based polymer) in a hydrazine or phenylhydrazine solution at room temperature.

The undoped or reduced type aniline-based polymer thus obtained is soluble in various organic solvents, and can be mixed in a state of solution with a polymerizable monomer solution comprising at least one of AXE, MXE, ACE or MCE represented by general formula (IA) or (IB) or compounds having alcoholic hydroxyl groups, wherein at least one hydrogen atom of the alcoholic hydroxyl groups is replaced by a unit represented by general formula (X) or (XI). The thus prepared mixture can be formed into a thin film, plate or disk, for example, by applying the mixture onto various supports such as an electrode, or molded into any other form, e.g., fiber, whereby an electrode can be manufactured. Solvents in which these aniline-based polymers are dissolved may vary depending on the substituent groups on the benzene rings of the aniline-based polymers and are not particularly limited. Generally, pyrrolidones such as N-methylpyrrolidone, amides such as dimethylformamide, polar solvents such as m-cresol, or dimethyl propylene urea, are good solvents.

According to the present invention, even a soluble electroconductive polymer like an aniline-based polymer soluble in an organic solvent can be formed into a flexible, thin-film, -plate or -disk electrode with the aid of (M)AXE polymer, (M)ACE polymer, (M)AE polymer or (M)ANE polymer and therefore, above-mentioned electroconductive polymers to be used in the electrode or battery of the present invention may be soluble or insoluble in organic solvent.

Next, an example for the manufacturing process of an electrode and a battery of the present invention will be explained in detail.

For example, at least one compound selected from AXE, MXE, ACE or MCE represented by general formula (IA) or (IB) or compounds having alcoholic hydroxyl groups, wherein at least one hydrogen atom of the alcoholic hydroxyl groups is replaced by a unit represented by general formula (X) or (XI), are mixed with an electroactive substance (positive electrode material or negative electrode material) mentioned above, with or without another polymerizable compound and/or with or without a plasticizer. In this case, compounds to be comprised are mixed in an appropriate proportion depending on the battery to be manufactured. The thus obtained mixture of polymerizable monomers/electroactive substances is molded into a form such as film, plate, disk and fiber and then polymerized to obtain an electrode. In this process, polymerization can be performed similarly as in the above-mentioned polymerization process for obtaining the (M)AXE polymer from AXE or MXE, or the (M)ACE polymer from ACE or MCE, or the (M)AE or (M)ANE polymer from compounds having alcoholic hydroxyl groups, wherein at least one hydrogen atom of the alcoholic hydroxyl groups is replaced by a unit represented by general formula (X) or (XI), for example, using heat and/or electromagnetic radiation. When the electroactive substance gives a flowable mixture of polymerizable monomer/electroactive material like, for example, an aniline-based polymer soluble in an organic solvent, the mixture is molded into a desired form, for example, applied on a support such as collector or other support made of glass or the like to form a film, plate or disk, followed by polymerization to manufacture an electrode.

The thus manufactured electrode comprising the above-mentioned electroactive substance is used as at least one of the electrodes and another electrode which has been similarly manufactured and comprises other electroactive material or a conventionally used electrode is used as the other one of the electrodes, and these two electrodes are put in a frame for construction of a battery or they are located on the support in such a configuration as they do not contact each other. For example, a negative electrode and positive electrode are attached at the edges thereof through a spacer of an appropriate thickness, placed in the above-mentioned frame, and then, after a polymerizable monomer mixture prepared by mixing at least one compound selected from AXE, MXE, ACE and MCE represented by the general formula (IA) or (IB), or compounds having alcoholic hydroxyl groups, wherein at least one hydrogen atom of the alcoholic hydroxyl groups is replaced by a unit represented by general formula (X) or (XI), with at least one electrolyte salt selected from the above-mentioned electrolyte salts such as alkali metal salts, with or without another polymerizable compound and/or with or without a plasticizer, is poured in between the negative and positive electrodes, the mixture is polymerized in the same manner as in the polymerization process for obtaining the above-mentioned (M)AXE polymer, (M)ACE polymer, (M)AE polymer, or (M)ANE polymer, for example, with heat and/or electromagnetic radiation and optionally further sealed with an insulating resin such as epoxy resins, whereby batteries are obtained in which a good contact between the electrode and the electrolyte is achieved. When the electrode obtained by polymerizing a mixture of the above-mentioned polymerizable monomers is used, batteries are obtained in which an especially good contact between the electrode and the electrolyte is achieved. In preparing such a polymerizable monomer mixture, the proportion of each component is appropriately decided depending on the battery to be manufactured. The above-mentioned battery frame or support may be made of metals such as stainless steels, resins such as polypropylene, and polyimide, or ceramic materials such electroconductive or insulating glass, although the material thereof are not particularly limited to those listed here. They may be shaped in a cylinder, a coin, a box, a sheet or any other form.

As described above, in fabricating a thin film, plate or disk battery a manufacturing process in which a polymerizable monomer comprising at least one electrolyte salt and at least one of AXE, MXE, ACE and MCE represented by general formula (IA) or (IB), or compounds having alcoholic hydroxyl groups, wherein at least one hydrogen atom of the alcoholic hydroxyl groups is replaced by a unit represented by general formula (X) or (XI) is polymerized to give a solid polymer electrolyte comprising (M)AXE polymer, (M)ACE polymer, (M)AE polymer or (M)ANE polymer is particularly useful.

As an example of the thus manufactured batteries of the present invention, FIG. 2 shows a schematic cross-sectional view of a thin solid-state battery. In FIG. 2, 1 is a positive electrode, 2 is a solid polymer electrolyte, 3 is a negative electrode, 4 is a collector, 5 is an insulating polyimide film which is a spacer, and 6 is an insulating resin sealing.

In the case where a cylindrical battery is fabricated, it is possible to use a method in which the above-described positive electrode and negative electrode are bonded to each other through a solid polymer electrolyte sheet prepared in advance, the resulting laminate is wound and then inserted in a cylindrical battery frame, in which the polymerizable monomer mixture as described above is poured, followed by polymerization.

Next, solid-state electric double layer capacitor of the present invention is explained below.

A whole solid-state electric double layer capacitor achieving high voltage output and large take-out current, and excellent in processability and reliability can be obtained by using the above-mentioned solid polymer electrolyte of the present invention in the solid-state electric double layer capacitor.

FIG. 3 is a schematic cross-sectional view showing an example of a solid-state electric double layer capacitor of the present invention. The solid-state electric double layer capacitor comprises a thin film cell having an area of 1 cm×1 cm and a thickness of about 0.5 mm. In FIG. 3, 8 is a collector, inside of which is arranged a pair of polarizable electrodes 7 and a solid polymer electrolyte film 9 is arranged between these electrodes. 10 is a spacer comprising an insulating film used in this embodiment, 11 is an insulating resin sealing and 12 is a lead wire.

The collector 8 is preferably made of a material which is electron-conducting and electrochemically anticorrosive, and has a specific surface area as large as possible. For example, there can be cited various metals and their sintered body, electron-conducting polymers, and carbon sheets.

Although the polarizable electrode 7 may comprise any polarizable material conventionally used in a solid-state electric double layer capacitor such as carbon materials, an electrode comprising a material obtained by compounding such a carbon material with the solid polymer electrolyte of the present invention is preferred. The carbon material as polarizable material is not particularly limited as long as it has a sufficient specific surface area. The larger the specific surface area, the larger the capacity of the electric double layer. So, it is preferred to use the polarizable material of as large a specific surface area as possible. For example, there can be used carbon blacks such as furnace black, thermal black (inclusive of acetylene black), and channel black; activated carbon such as coconut shell activated carbon, natural graphite, synthesized graphite, carbon prepared by a vapor phase method, graphitized carbon produced therefrom, polyacene, and fullerenes such as $C_{60}$ and $C_{70}$.

Next, an example for fabricating the solid-state electric double layer capacitor of the present invention is explained below.

As described above, a manufacturing process in which a mixture of polymerizable monomer mixture obtained by mixing at least one electrolyte salt and at least one of the above-mentioned AXE, MXE, ACE or MCE represented by general formula (IA) or (IB), or compounds having alcoholic hydroxyl groups, wherein at least one hydrogen atom of the alcoholic hydroxyl groups is replaced by a unit represented by general formula (X) or (XI), is polymerized and made into a compounded body comprising (M)AXE polymer, (M)ACE polymer, (M)AE polymer or (M)ANE polymer and at least one electrolyte salt is particularly useful in manufacturing a solid-state electric double layer capacitor of the present invention.

In manufacturing a polarizable electrode comprising a polarizable material such as carbon materials and the above-mentioned (M)AXE polymer, (M)ACE polymer, (M)AE polymer or (M)ANE polymer which is preferably used in a solid-state electric double layer capacitor of the present invention, first, at least one compound selected from AXE, MXE, ACE or MCE represented by general formula (IA) or (IB) or compounds having alcoholic hydroxyl groups, wherein at least one hydrogen atom of the alcoholic hydroxyl groups is replaced by a unit represented by general formula (X) or (XI), with or without another polymerizable compound and/or with or without a plasticizer, are mixed with a polarizable material. Each component is mixed in appropriate proportions which are decided depending on the capacitor to be manufactured. The thus obtained mixture of polymerizable monomers/polarizable materials are formed into a film, plate or disk on a support, for example, on the collector, and then polymerized similarly as in the above-mentioned polymerization process for obtaining the (M)AXE polymer from AXE or MXE, or the (M)ACE polymer from ACE or MCE, or the (M)AE polymer or (M)ANE polymer from compounds having alcoholic hydroxyl groups, wherein at least one hydrogen atom of the alcoholic hydroxyl groups is replaced by a unit represented by general formula (X) or (XI), for example, with heat or electromagnetic radiation, whereby a polarizable electrode is manufactured. According to the present invention, compounded thin-film, -plate or -disk electrodes can be manufactured which have a good contact with the collector.

Two of the thus manufactured polarizable electrodes are placed in a frame for construction of a capacitor or they are located on the support in such a configuration as they do not contact each other. For example, the two electrodes are bonded at the edges thereof through a spacer of an appropriate thickness, placed in the above-mentioned frame, and then, after a polymerizable monomer mixture prepared by mixing at least one compound selected from AXE, MXE, ACE and MCE represented by general formula (IA) or (IB), or compounds having alcoholic hydroxyl groups, wherein at least one hydrogen atom of the alcoholic hydroxyl groups is replaced by a unit represented by general formula (X) or (XI) and at least one electrolyte salt selected from the above-mentioned electrolyte salt such as alkali metal salts, with or without another polymerizable compound and/or with or without a plasticizer, is poured in between the two electrodes, the mixture is polymerized in the same manner as mentioned above, and optionally further sealed with an insulating resin such as epoxy resins, whereby electric double layer capacitors are obtained in which a good contact between the electrode and the electrolyte is achieved. In preparing such a monomer mixture, the components are mixed in appropriate proportions which are decided depending on the capacitor to be manufactured. The above-mentioned capacitor frame or support may be made of any material like metals such as stainless steels; resins such as polypropylene, and polyimide; or ceramic materials such as electroconductive or insulating glass, although the material thereof is not particularly limited to those listed here. They may be shaped in a cylinder, a coin, a box, a sheet or any other form.

The shape of the solid-state electric double layer capacitor may be, in addition to the sheet type as shown in FIG. 3, a coin-type or a cylinder-type which can be fabricated by winding a laminate of a sheet-like polarizable electrode and a sheet-like solid polymer electrolyte in the form of a cylinder, inserting the cylinder in a cylindrical capacitor frame and sealed.

When a cylindrical capacitor is to be fabricated, it is also possible to use a process in which the above-described polarizable electrodes are bonded through the solid polymer electrolyte sheet prepared in advance, the laminate is wound and inserted in a cylindrical capacitor frame, and then the above-mentioned polymerizable monomer mixture is poured in, and then polymerized.

ADVANTAGEOUS EFFECTS

The solid polymer electrolyte of the present invention is a solid polymer electrolyte comprising a comb-shaped or network-shaped polymer having incorporated into its side chain an oxyalkyl group containing a urethane bond, which polymer, as described above, can be readily made and compounded into film, plate, disk, fiber or the like from a polymerizable monomer mixture as a raw material and which has high ionic conductivity, good strength as film or other shaped article and an excellent processability to thin film, plate, disk, fiber or the like.

The battery of the present invention comprising the above-mentioned solid polymer electrolyte as an ionic conducting substance can be easily produced in the form of a thin film-, plate- or coin-type, and it is free from short-circuit even when made in such a form. It produces a large take out current and provides a highly reliable battery, especially a whole solid type battery.

Also, the battery of the present invention having a negative electrode which comprises an electroactive material of lithium, lithium alloy, a carbon material which can occlude and discharge lithium ion or the like can be easily produced in the form of a thin film-, plate-, or coin-type by using the above-mentioned solid polymer electrolyte as an ionic conducting substance, and it is free from short-circuit even when made in such a form. It produces a large take out current and provides a highly reliable battery, especially a whole solid type battery.

Furthermore, the battery of the present invention having a positive electrode which comprises the above-mentioned (M)AXE polymer, (M)ACE polymer, (M)AE polymer or (M)ANE polymer and an aniline-based polymer soluble in organic solvent or other electroconductive polymer, metal oxide, metal sulfide, a carbon material or the like and is characterized by using the above-mentioned solid polymer electrolyte as ionic conducting substance can be easily produced in the form such as a thin film-, plate- or coin-type, and it is free from short-circuit even when made in such a form. It produces a large take out current and provides a highly reliable battery, especially a whole solid type one.

Still further, the electrode of the present invention which comprises the above-mentioned (M)AXE polymer, (M)ACE polymer, (M)AE polymer or (M)ANE polymer, and an electroactive substance such as an aniline-based polymer soluble in organic solvent or other electroconductive polymer, metal oxide, metal sulfide, a carbon material or the like and the manufacturing process of said electrode provide an electrode having desired flexibility without deteriorating excellent electrochemical activity which the said electroactive substance has, and specifically provide, for example, thin film-, plate- or disk-like electrode useful in various batteries.

In addition, according to the manufacturing process of the battery of the present invention, batteries in various shapes can be manufactured, especially it facilitates batteries to be made thinner and provides highly reliable batteries which can operate at high capacity and at high voltage and has good cyclability.

The electric double layer capacitor of the present invention is one which comprises, as an ionic conducting substance, a solid polymer electrolyte that can be prepared by dissolving an electrolyte salt in an above-described polymerizable monomer mixture which gives a comb-shaped or network-shaped polymer having an oxyalkyl group containing a urethane bond and can be readily molded and compounded into a film, plate or disk of good strength, and then polymerizing the mixture. It is free from short-circuit even when made in the form of a thin film-, plate- or disk-type, provides a highly reliable electric double layer capacitor having a high output voltage and a large take out current, especially a solid-state electric double layer capacitor.

In particular, the electric double layer capacitor and the process for manufacturing the same according to the present invention provide a highly reliable electric double layer capacitor achieving a good contact between the polarizable electrode and the solid polymer electrolyte which functions as an ionic conducting substance, a high voltage output and a large take out current, and especially provide a whole solid-state electric double layer capacitor.

BEST MODE FOR CARRYING OUT THE INVENTION

Hereinafter, the present invention will be described more concretely by representative examples. Needless to say, these examples are mere examples for the purpose of explanation and the present invention is not by any means limited to these examples.

EXAMPLE 1

(1) Synthesis of 2-acryloyloxyethylcarbamic acid ω-methyloligooxyethyl ester (ACOA (350)) (a compound represented by the general formula (IIB) which corresponds to formula (IIA) (x=2, y=0, z=1), wherein $R_1$ is H, $R^3$ is $(CH_2)_2$ and $R^4$ is $CH_3$)

0.1 mol (14.1 g) of 2-acryloyloxyethylisocyanate (AOI) and 0.1 mol (35 g) of monomethyloligoethylene glycol having an average molecular weight of 350 were dissolved in 100 ml of sufficiently purified tetrahydrofuran (THF) under a nitrogen atmosphere, and thereafter, 0.66 g of dibutyltin dilaurate was added thereto. Reaction was run at 50° C. for about 3 hours to obtain ACOA (350) as a colorless viscous liquid. $_1$H-NMR, IR and elemental analyses were made, and the results revealed that AOI and monomethyloligoethylene glycol reacted in a molar proportion of 1:1, and that the isocyanate group in AOI disappeared and a urethane bond was formed.

(2) Production and evaluation of ACOA (350)-based solid polymer electrolyte 1.46 g of ACOA (350) was dissolved in 10 ml of THF and 0.14 g of $LiCF_3SO_3$ was added thereto and mixed well. Then, THF was removed at room temperature under reduced pressure. Thus, an ACOA (350)/$LiCF_3SO_3$ mixture (polymerizable monomer mixture) was obtained as a viscous liquid. Under argon atmosphere, a portion of the mixture thus obtained was applied on a glass plate, and heated at 100° C. for 1 hour to produce an ACOA (350) polymer/$LiCF_3SO_3$ composite as a transparent film of about 200 μm thickness. The ionic conductivity of the film measured at 25° C. by an impedance method was $2 \times 10^{-4}$ S/cm.

EXAMPLE 2

(1) Synthesis of 2-acryloyloxyethylcarbamic acid 2-acryloyloxyethylcarbamoyloligooxyethyl ester (ACAC (400)) (a compound represented by the general formula (IIB) which corresponds to formula (IIA) (x=2, y=0, z=1) wherein $R_1$ is H, $R^3$ is $(CH_2)_2$ and $R^4$ is $CONH(CH_2)_2OCOCH=CH_2$)

0.2 mol (28.2 g) of 2-acryloyloxyethylisocyanate (AOI) and 0.1 mol (40 g) of oligoethylene glycol having an average molecular weight of 400 were dissolved in 100 ml of sufficiently purified THF under a nitrogen atmosphere, and thereafter, 0.66 g of dibutyltin dilaurate was added thereto. Reaction was run at 50° C. for about 3 hours to obtain ACAC (400) as a colorless viscous liquid. $^1$H-NMR, IR and elemental analyses were made, and the results indicated that AOI and oligoethylene glycol reacted in a molar proportion of 2:1, and that the isocyanate group in AOI disappeared and urethane bonds were formed.

(2) Production and evaluation of ACOA (350)/ACAC (400) copolymer-based solid polymer electrolyte 1.46 g of ACOA (350) synthesized in Example 1 and 0.40 g of ACAC (400) synthesized in Example 2(1) were dissolved in 20 ml of THF, and 0.14 g of $LiCF_3SO_3$ was added thereto and mixed well. Then, THF was removed at room temperature under reduced pressure. Thus, an ACOA (350)/ACAC (400)/$LiCF_3SO_3$ mixture (polymerizable monomer mixture) was obtained as a viscous liquid. Under argon atmosphere, a portion of the mixture thus obtained was applied on a glass plate, and heated at 100° C. for 1 hour to produce an ACOA (350)/ACAC (400) copolymer/$LiCF_3SO_3$ composite as a transparent, free-standing film of about 100 μm thickness. The ionic conductivity of the film measured at 25° C. by an impendance method was $2 \times 10^{-5}$ S/cm

EXAMPLE 3

A solid polymer electrolyte was produced and fabricated in the same manner as in Example 1, except for using 0.15 g of $NaCF_3SO_3$ instead of $LiCF_3SO_3$ used in Example 1. The ionic conductivity of the thus fabricated film measured at 25° C. by an impedance method was $2 \times 10^{-4}$ S/cm.

EXAMPLE 4

A solid polymer electrolyte was produced and fabricated in the same manner as in Example 1, except for using 0.11 g of LiI instead of $LiCF_3SO_3$ used in Example 1. The ionic conductivity of the thus fabricated film measured at 25° C. by an impedance method was $3 \times 10^{-4}$ S/cm.

EXAMPLE 5

(1) Synthesis of 2-methacryloyloxyethylcarbamic acid ω-methyloligooxyethyl ester (MCOA (550)) (a compound represented by the general formula (IIB) which corresponds to formula (IIA) (x=2, y=0, z=1) wherein $R^1$ and $R^4$ are $CH_3$, and $R^3$ is $(CH_2)_2$)

0.1 mol (15.5 g) of 2-methacryloyloxyethylisocyanate (MOI) and 0.1 mol (55 g) of monomethyloligoethylene glycol having an average molecular weight of 550 were dissolved in 100 ml of sufficiently purified THF under a nitrogen atmosphere, and thereafter, 0.66 g of dibutyltin dilaurate was added thereto. Reaction was run at 50° C. for about 3 hours to obtain MCOA (550) as a colorless viscous liquid. $^1$H-NMR, IR and elemental analyses were made, and the results indicated that MOI and monomethyloligoethylene glycol reacted in a molar proportion of 1:1, and that the isocyanate group in MOI disappeared and a urethane bond was formed.

(2) Production and evaluation of MCOA (550)-based solid polymer electrolyte 2.09 g of MCOA (550) was dissolved in 10 ml of THF and 0.14 g of $LiCF_3SO_3$ was added thereto and mixed well. Then, THF was removed at room temperature under reduced pressure. Thus, a MCOA (550)/LiCF$_3$SO$_3$ mixture (polymerizable monomer mixture) was obtained as a viscous liquid. Under argon atmosphere, a portion of the mixture thus obtained was applied on a glass plate, and heated at 100° C. for 1 hour to produce a MCOA (550) polymer/LiCF$_3$SO$_3$ composite as a transparent, free-standing film of about 200 µm thickness. The ionic conductivity of the film measured at 25° C. by an impedance method was $3\times10^{-5}$ S/cm.

EXAMPLE 6

(1) Synthesis of 2-acryloyloxyethylcarbamic acid 2-acryloyloxyethylcarbamoyloligooxyethyl ester (ACAC (600)) (a compound represented by the general formula (IIB) which corresponds to formula (IIA) (x=2, y=0, z=1) wherein R$^1$ is H, R$^3$ is (CH$_2$)$_2$ and R$^4$ is CONH(CH$_2$)$_2$OCOCH=CH$_2$)

0.2 mol (28.2 g) of 2-acryloyloxyethylisocyanate (AOI) and 0.1 mol (60 g) of oligoethylene glycol having an average molecular weight of 600 were dissolved in 100 ml of sufficiently purified THF under a nitrogen atmosphere, and thereafter, 0.66 g of dibutyltin dilaurate was added thereto. Reaction was run at 50° C. for about 3 hours to obtain ACAC (600) as a colorless gel-like solid. $^1$H-NMR, IR and elemental analyses were made, and the results indicated that AOI and oligoethylene glycol reacted in a molar proportion of 2:1, and that the isocyanate group in AOI disappeared and urethane bonds were formed.

(2) Production and evaluation of MCOA (550)/ACAC (600) copolymer-based solid polymer electrolyte 2.10 g of MCOA (550) and 0.51 g of ACAC (600) were dissolved in 20 ml of THF and 0.14 g of LiCF$_3$SO$_3$ was added thereto and mixed well. Then, THF was removed at room temperature under reduced pressure. Thus, a MCOA (550)/ACAC (600)/LiCF$_3$SO$_3$ mixture (polymerizable monomer mixture) was obtained as a viscous liquid. Under argon atmosphere, a portion of the mixture thus obtained was applied on a glass plate, and heated at 100° C. for 1 hour to produce a MCOA (550)/ACAC (600) copolymer/LiCF$_3$SO$_3$ composite as a transparent, free-standing film of about 100 µm thickness. The ionic conductivity of the film measured at 25° C. by an impedance method was $1\times10^{-5}$ S/cm.

EXAMPLE 7

(1) Synthesis of 2-acryloyloxyethylcarbamic acid ω-methyloligooxyethyl ester (ACOA (164)) (a compound represented by the general formula (IIB) which corresponds to formula (IIA) (x=2, y=0, z=1) wherein R$^1$ is H, R$^3$ is (CH$_2$)$_2$ and R$^4$ is CH$_3$)

0.1 mol (14.1 g) of AOI and 0.1 mol (16 g) of monomethyltriethylene glycol having an average molecular weight of 164 were dissolved in 100 ml of sufficiently purified THF under a nitrogen atmosphere, and thereafter, 0.66 g of dibutyltin dilaurate was added thereto. Reaction was run at 50° C. for about 3 hours to obtain ACOA (164) as a pale yellow viscous liquid. $^1$H-NMR, IR and elemental analyses were made, and the results indicated that AOI and monomethyltriethylene glycol reacted in a molar proportion of 1:1, and that the isocyanate group in AOI disappeared and a urethane bond was formed.

(2) Production and evaluation of ACOA (164)/ACAC (400) copolymer-based solid polymer electrolyte 0.95 g of ACOA (164) and 0.40 g (ACAC) synthesized in Example 2(1) were dissolved in 20 ml of THF and 0.14 g of LiCF$_3$SO$_3$ was added thereto and mixed well. Then, THF was removed at room temperature under reduced pressure. Thus, an ACOA (164)/ACAC (400)/LiCF$_3$SO$_3$ mixture (polymerizable monomer mixture) was obtained as a viscous liquid. Under argon atmosphere, a portion of the mixture thus obtained was applied on a glass plate, and heated at 100° C. for 1 hour to produce an ACOA (164)/ACAC (400) copolymer/LiCF$_3$SO$_3$ composite as a transparent, free-standing film of about 100 µm thickness. The ionic conductivity of the film measured at 25° C. by an impedance method was $8\times10^{-6}$ S/cm.

EXAMPLE 8

A solid polymer electrolyte was produced and fabricated in the same manner as in Example 5, except for using 0.13 g of NaCF$_3$SO$_3$ instead of LiCF$_3$SO$_3$ used in Example 7. The ionic conductivity of the thus fabricated film measured at 25° C. by an impedance method was $9\times10^{-6}$ S/cm.

EXAMPLE 9

A solid electrolyte was produced and fabricated in the same manner as in Example 7, except for using 0.30 g of AgI instead of LiCF$_3$SO$_3$ used in Example 7. The ionic conductivity of the thus fabricated film measured at 25° C. by an impedance method was $8\times10^{-5}$ S/cm.

EXAMPLE 10

(1) Synthesis of 2-acryloyloxyethylcarbamic acid ω-methyloligooxypropyl ester (ACOA (440)) (a compound represented by the general formula (IIB) which corresponds to formula (IIA) (x=2, y=0, z=1) wherein R$_1$ is H, R$^3$ is CH(CH$_3$)CH$_2$ and R$^4$ is CH$_3$)

0.1 mol (14.1 g) of AOI and 0.1 mol (44 g) of monomethyloligopropylene glycol having an average molecular weight of 440 were dissolved in 100 ml of sufficiently purified THF under a nitrogen atmosphere, and thereafter, 0.66 g of dibutyltin dilaurate was added thereto. Reaction was run at 50° C. for about 3 hours to obtain ACOA (440) as a pale yellow viscous liquid. $^1$H-NMR, IR and elemental analyses were made, and the results revealed that AOI and monomethyloligopropylene glycol reacted in a molar proportion of 1:1, and that the isocyanate group in AOI disappeared and a urethane bond was formed.

(2) Production and evaluation of ACOA (440)/ACAC (400) copolymer-based solid polymer electrolyte 1.84 g of ACOA (440) and 0.40 g of ACAC (400) prepared in Example 2 were dissolved in 20 ml of THF and 0.14 g of LiCF$_3$SO$_3$ was added thereto and mixed well. Then, THF was removed at room temperature under reduced pressure. Thus, an ACOA (440)/ACAC (400)/LiCF$_3$SO$_3$ mixture (polymerizable monomer mixture) was obtained as a viscous liquid. Under argon atmosphere, a portion of the mixture thus obtained was applied on a glass plate, and heated at 100° C. for 1 hour to produce an ACOA (440)/ACAC (400) copolymer/LiCF$_3$SO$_3$ composite as a transparent, free-standing film of about 100 µm thickness. The ionic conductivity of the film measured at 25° C. by an impedance method was $3\times10^{-5}$ S/cm.

EXAMPLE 11

A solid polymer electrolyte as a transparent, free-standing film was produced and fabricated in the same manner as in Example 10, except for using 0.30 g of tetrabutylammonium tetrafluoroborate (TBAB) instead of LiCF$_3$SO$_3$ used in Example 10. The ionic conductivity of the thus fabricated film measured at 25° C. by an impedance method was $9\times10^{-6}$ S/cm.

EXAMPLE 12

0.48 g of ACOA (164) prepared in Example 7, 2.05 g of MCOA (550) prepared in Example 5 and 0.40 g of ACAC (400) prepared in Example 2 were dissolved in 10 ml of THF and 0.17 g of $LiCF_3SO_3$ was added thereto and mixed well. Then, THF was removed at room temperature under reduced pressure. Thus, an ACOA (164)/MCOA (550)/ACAC (400)/ $LiCF_3SO_3$ mixture (polymerizable monomer mixture) was obtained as a highly viscous semi-solid. Under argon atmosphere, a portion of the mixture thus obtained was applied on a glass plate, and heated at 100° C. for 1 hour to produce an ACOA (164)/MCOA (550)/ACAC (400) copolymer/$LiCF_3SO_3$ composite as a transparent, free-standing film of about 150 μm thickness. The ionic conductivity of the film measured at 25° C. by an impedance method was $1 \times 10^{-5}$ S/cm.

EXAMPLE 13

Temperature dependence of the ionic conductivity of the solid polymer electrolyte film fabricated in Example 1 was measured by an impedance method. FIG. 1 illustrates the results obtained. In FIG. 1, the ordinate indicates ionic conductivity on a logarithmic scale while the abscissa indicates temperature in terms of 1,000/absolute temperature, and thus the data are shown in an Arrhenius plot with the slope representing the activation energy for the migration of an ion in the ACOA (350) polymer/$LiCF_3SO_3$-based solid polymer electrolyte.

EXAMPLE 14

1.46 g of ACOA (350) prepared in Example 1, 0.40 g of ACAC (400) prepared in Example 2, 1.5 g of propylene carbonate (PC), and 0.28 g of $LiCF_3SO_3$ were mixed well under an argon atmosphere to obtain an ACOA (350)/ACAC (400)/PC/$LiCF_3SO_3$ mixture (polymerizable monomer mixture) as a viscous liquid. Under argon atmosphere, a portion of the mixture thus obtained was applied on a glass plate, and heated at 100° C. for 1 hour to produce an ACOA (350)/ACAC (400) copolymer/PC/$LiCF_3SO_3$ composite as a transparent, free-standing film of about 300 μm thickness. The ionic conductivity of the film measured at 25° C. by an impedance method was $2 \times 10^{-3}$ S/cm.

EXAMPLE 15

An ACOA (350)/ACAC (400) copolymer/TG/$LiCF_3SO_3$ composite as a transparent, free-standing film of about 350 μm thickness was fabricated in the same manner as in Example 14, except for using tetraglyme (TG) instead of propylene carbonate used in Example 14. The ionic conductivity of the film measured at 25° C. by an impedance method was $7 \times 10^{-4}$ S/cm.

EXAMPLE 16

An ACOA (350)/ACAC (400) copolymer/DEC/ $LiCF_3SO_3$ composite as a transparent, free-standing film of about 250 μm thickness was fabricated in the same manner as in Example 14, except for using diethyl carbonate (DEC) instead of propylene carbonate used in Example 14. The ionic conductivity of the film measured at 25° C. by an impedance method was $3 \times 10^{-3}$ S/cm.

EXAMPLE 17

Synthesis of a compound represented by the general formula (IIIB) which corresponds to formula (IIIA) (x=2, y=0, z=1) wherein $R^1$ and $R^4$ are $CH_3$, $R^3$ and $R^6$ are $(CH_2)_2$ and $R^5$ is $(CH_2)_6$ 0.1 mol (16.8 g) of hexamethylenediisocyanate, 0.1 mol (40 g) of polyethylene glycol having an average molecular weight of 400 and 0.1 mol (16.4 g) of triethylene glycool monomethylether were dissolved in 100 ml of THF sufficiently purified under nitrogen atmosphere and 0.66 g of dibutyltin dilaurate was added thereto. After the mixture was reacted at 60° C. for about 1 hour, colorless viscous liquid product was obtained. $^1$H-NMR, IR and elemental analyses showed that the isocyanate group in hexamethylenediisocyanate disappeared and urethane bonds were formed. The product was also tested by gel permeation chromatography (GPC), which indicated that the average molecular weight of the obtained product was about 750 as calculated using polyethylene glycol sa a molecular-weight standard material. 75 g of this compound prepared in the same manner as above and 0.1 mol (15.5 g) of MOI were dissolved in 100 ml of sufficiently purified THF under nitrogen atmosphere and 0.66 g of dibutyltin dilaurate was added thereto. After the mixture was reacted at 50° C. for about 3 hours, colorless viscous liquid product was obtained. $^1$H-NMR, IR and elemental analyses showed that the isocyanate group in MOI disappeared and the number of urethane bonds were increased.

2.69 g of this monomer was dissolved in 10 ml of THF and 0.14 g of $LiCF_3SO_3$ was added thereto to prepare a polymerizable monomer mixture. Then, under argon atmosphere, a portion of the mixture thus obtained was applied on a glass plate, and heated at 100° C. for 1 hour for effecting polymerization and a solid polymer electrolyte was produced as a transparent, free-standing film of about 100 μm thickness. The ionic conductivity of the film measured at 25° C. by an impedance method was $1 \times 10^{-5}$ S/cm.

EXAMPLE 18

Synthesis of a compound represented by the general formula (IIIB) which corresponds to formula (IIIA) (x=2, y=0, z=1) wherein $R^1$ is H, $R^3$ and $R_6$ are $(CH_2)_2$ and $R^4$ is CONH $(CH_2)_6NHCO(OCH_2CH_2)_m$—$OCONH(CH_2)_2$ $OCOCH=CH_2$ 0.1 mol (16.8 g) of hexamethylenediisocyanate, 0.2 mol (80 g) of polyethylene glycol having an average molecular weight of 400 were dissolved in 100 ml of sufficiently purified THF under nitrogen atmosphere and 0.66 g of dibutyltin dilaurate was added thereto. After the mixture was reacted at 60° C. for about one hour, white solid product was obtained. $^1$H-NMR, IR and elemental analyses showed that the isocyanate group in hexamethylenediisocyanate disappeared and urethane bonds were formed. The GPC measurement of this product showed that the average molecular weight of the obtained product was about 1,000 as calculated using polyethylene glycol as a molecular-weight standard material. 50 g of this compound and 0.1 mol (14.1 g) of AOI were dissolved in 100 ml of sufficiently purified THF under nitrogen atmosphere and 0.66 g of dibutyltin dilaurate was added thereto. After the mixture was reacted at 50° C. for about 3 hours, white solid product was obtained. $^1$H-NMR, IR and elemental analyses showed that the isocyanate group in AOI disappeared and the number of urethane bonds were increased.

EXAMPLE 19

2.69 g of the monomer obtained in Example 17, 0.74 g of the monomer obtained in Example 18, 1.8 g of propylene carbonate (PC), 1.8 g of ethylene carbonate (EC) and 0.28 g of $LiCF_3SO_3$ were mixed well under argon atmosphere to produce a polymerizable monomer mixture as a viscous liquid. Under argon atmosphere, a portion of the mixture thus obtained was applied on a glass plate, and heated at 100° C. for 1 hour for effecting polymerization and a plastic solid polymer electrolyte was obtained as a transparent, free-standing film of about 300 μm thickness. The ionic conductivity of the film measured at 25° C. by an impedance method was $1 \times 10^{-3}$ S/cm.

EXAMPLE 20
Production of a polymerizable monomer mixture 2.10 g of MCOA (550) prepared in Example 5, 0.51 g of ACAC (600) prepared in Example 6, 1.3 g of propylene carbonate (PC), 1.3 g of ethylene carbonate (EC) and 0.56 g of $LiBF_4$ were mixed well under an argon atmosphere to produce a polymerizable monomer mixture consisting of a MCOA (550)/ACAC (600)/PC/EC/$LiBF_4$ mixture as a viscous liquid.

Under argon atmosphere, the mixture was applied on a glass plate, and heated at 100° C. for 1 hour to produce a MCOA (550)/ACAC (600) copolymer/PC/EC/$LiBF_4$ composite as a transparent, free-standing film of about 300 μm thickness. The ionic conductivities of the film measured at 25° C. and −10° C. by an impedance method were $3 \times 10^{-3}$ S/cm and $1 \times 10^{-3}$ S/cm, respectively.

EXAMPLE 21
Production of a positive electrode comprising cobalt oxide and solid polymer electrolyte 11 g of $Li_2CO_3$ and 24 g of $Co_3O_4$ were mixed well and heated at 800° C. for 24 hours under an oxygen atmosphere, followed by pulverizing to obtain $LiCoO_2$ powder. The $LiCoO_2$ powder and the polymerizable monomer mixture produced in Example 20 were mixed in a proportion by weight of 7:3 under an argon atmosphere, and a portion of the mixture thus obtained was applied on a stainless steel foil in an area of 1 cm×1 cm and to a thickness of about 200 μm. Further, the coated foil was heated at about 100° C. for 1 hour for polymerization to produce a cobalt oxide/solid polymer electrolyte composite positive electrode (65 mg).

EXAMPLE 22
Fabrication of secondary battery comprising solid polymer electrolyte In a glove box under an argon atmosphere, a lithium foil of 75 μm thickness was cut to a piece of 1 cm×1 cm (5.3 mg). At each edge portion (1 mm width) of the foil was covered with a polyimide film of 10 gm thickness as a spacer. Next, 15 mg of the polymerizable monomer mixture produced in Example 20 was applied on the lithium foil, and then, the cobalt oxide positive electrode produced in example 21 was tightly fitted onto the mixture-coated surface of the lithium foil. The resulting structure was heated at 100° C. for 1 hour, and the edge portions of the battery were sealed with an epoxy resin to produce a solid-state lithium/cobalt oxide secondary battery having a structure same as shown in FIG. 2.

This battery was subjected to repeated charging and discharging at an operating voltage of 2.0 to 4.3 V and at a constant current of 0.1 mA. As a result, it revealed that the maximum discharge capacity was 4.0 mAh, and a cycle life until the capacity decreased to 50% was 200 times.

EXAMPLE 23
Production of a positive electrode comprising polyaniline and solid polymer electrolyte Electrolytic oxidative electrochemical polymerization was performed on a 1 cm×1 cm stainless steel foil using a graphite foil as the counter electrode and a 0.5M aqueous aniline solution and a 1.5M aqueous $HBF_4$ solution by a constant current method at a current of 1 mA to obtain a film of about 100 μm thickness. Then, the film was washed with methanol and dried at 80° C. for 24 hours under vacuum.

Then, the thus obtained film (15 mg in weight) was transferred into a glove box under an argon atmosphere, and impregnated with the polymerizable monomer mixture produced in Example 20. Then, polymerization was performed at 100° C. for 1 hour to produce a positive electrode comprising polyaniline/solid polymer electrolyte (45 mg).

EXAMPLE 24
Fabrication of secondary battery comprising lithium, polyaniline and solid polymer electrolyte A lithium/polyaniline solid secondary battery was produced in the same manner as in Example 22 except that the positive electrode comprising polyaniline and solid polymer electrolyte produced in Example 23 was used instead of that comprising cobalt oxide.

This battery was subjected to repeated charging and discharging at an operating voltage of 2.0 to 4.0 V and at a constant current of 0.1 mA. As a result, it revealed that the maximum discharge capacity was 1.0 mAh, and a cycle life until the capacity decreased to 50% was 500 times.

EXAMPLE 25
Production of a negative electrode comprising graphite produced by a vapor phase method and solid polymer electrolyte 10 g of graphite fiber produced by a vapor phase method and subsequent graphitization by Showa Denko K. K. (average fiber diameter: 0.3 μm, average fiber length: 2.0 μm, heat treated at 2,700° C.) was mixed with 200 ml of 2.5M butyllithium solution in n-hexane and stirred for 8 hours at room temperature to incorporate lithium ion in advance, followed by washing with hexane and drying in vacuo. 6 g of the graphite fiber thus prepared which incorporated lithium at an atomic ratio of C/Li=12/1 (determined by elemental analysis) and 4 g of the polymerizable monomer mixture prepared in Example 20 were mixed under an argon atmosphere and an aliquot of the mixture was applied on a stainless steel foil to an area of 1 cm×1 cm and a thickness of about 150 μm. The coated foil was heated at about 100° C. for 1 hour for polymerization to produce a negative electrode comprising a graphite (C/Li=12/1) and solid polymer electrolyte (21 mg).

EXAMPLE 26
Fabrication of a secondary battery comprising an electrode comprising graphite fiber, cobalt oxide and solid polymer electrolyte.

A graphite fiber/cobalt oxide solid secondary battery was produced in the same manner as in Example 22 except that the negative electrode comprising graphite fiber (C/Li=12/1) and solid polymer electrolyte produced in Example 25 was used instead of the lithium foil. This battery was subjected to repeated charging and discharging at an operating voltage of 1.5 to 4.3 V and at a constant current of 0.1 mA. As a result, it revealed that the maximum discharge capacity was 3.8 mAh, and a cycle life until the capacity decreased to 50% was 300 times.

EXAMPLE 27
Synthesis of organic solvent-soluble polyaniline

In a 1 liter four-necked flask equipped with a thermometer, a stirrer and a condenser was placed 500 ml of 1N aqueous HCl solution and 20.3 g of aniline was dissolved therein while bubbling nitrogen. Then, 11.5 g of solid ammonium persulfate was added over about 30 minutes while stirring and bubbling nitrogen. Reaction temperature was kept at about 22° C. After the addition, the reaction was further continued for additional 22 hours. Then, the reaction mixture was filtered, and the residue was washed with 500 ml of deionized water. Then, the product was transferred into a beaker, and 500 ml of a 5% ammonia water was added and the mixture was stirred for about 1 hour, followed by filtration. The residue was washed with deionized water and dried under reduced pressure to obtain about 16 g of undoped polyaniline powder.

Next, in a 300 ml three-necked flask was placed 150 ml of hydrazine monohydrate, and the above-described undoped polyaniline powder was added little by little at room temperature for about 1 hour while stirring and flowing nitrogen. Further, under flow of nitrogen, the mixture was stirred for about 10 hours at room temperature. Then, the reaction mixture was filtered under a nitrogen atmosphere and the residue was dried under reduced pressure. Further, under nitrogen atmosphere, the residue was washed with purified THF and with purified ether, followed by drying under reduced pressure to obtain about 14 g of reduced polyaniline powder.

Elemental analysis value of the reduced polyaniline powder was as follows: total of carbon, hydrogen and nitrogen was 98%, and elemental ratio of carbon/hydrogen/nitrogen was 6.00/4.95/1.01, which substantially coincided with the calculated value.

The powder dissolved in purified N-methylpyrrolidone (NMP) to a concentration of up to about 5 wt % under nitrogen atmosphere. The number-average molecular weight of the polyaniline obtained from the GPC measurement of the solution was about 20,000 as calculated using polystyrene as a molecular-weight standard material.

EXAMPLE 28

Production of a positive electrode comprising polyaniline and solid polymer electrolyte In a glove box under an argon atmosphere, the polymerizable monomer mixture prepared in Example 20 was mixed with the 5 wt % polyaniline/NMP mixture prepared in Example 27 so that the proportion by weight of the polyaniline and the polymerizable monomer mixture was 1:1. A portion of the resulting mixture was applied on a stainless steel foil of a size of 15×15 mm and of a thickness of 100 $\mu$m in an area surrounded by a polyimide film of 50 $\mu$m thickness affixed to each edge portion of the foil in a width of 3 mm.

Then, the foil coated with the mixture was heated at 60° C., 80° C. and 100° C. each for 1 hour to dry the coating and polymerize the monomers to produce a positive electrode comprising polyaniline and solid polymer electrolyte (68 mg).

EXAMPLE 29

Fabrication of secondary battery comprising lithium, polyaniline and solid polymer electrolyte In a glove box under an argon atmosphere, a lithium foil of 25 $\mu$m thick was cut to a piece of 12×12 mm (2.6 mg). At each edge portion (2 mm width) of the foil was covered with a polyimide film of 10 $\mu$m thickness as a spacer. Next, a portion of the polymerizable monomer mixture prepared in Example 20 was applied on the lithium foil, and then the polyaniline positive electrode produced in Example 28 was tightly fitted onto the coated surface of the lithium foil. The resulting structure was heated at 100° C. for 1 hour, and the edge portions of the battery were sealed with an epoxy resin to produce a solid-state lithium/polyaniline secondary battery having a structure same as shown in FIG. 2.

This battery was subjected to repeated charging and discharging at an operating voltage of 2 to 4 V and at a constant current density of 0.1 mA. As a result, it revealed that the maximum discharge capacity was 1.5 mAh, and a cycle life until the capacity decreased to 50% was 200 times.

EXAMPLE 30

Production of a positive electrode comprising poly-o-anisidine and solid polymer electrolyte 18 g of reduced poly-o-anisidine powder was synthesized and treated in the same manner as in Example 27 except that 27.0 g of o-anisidine was used instead of the aniline used in Example 27.

Elemental analysis value of the reduced poly-o-anisidine powder was: total of carbon, hydrogen and nitrogen was 98%, and elemental ratio of carbon/hydrogen/nitrogen was 7.00/6.91/1.03, which substantially coincided with the calculated value.

The reduced poly-o-anisidine powder dissolved in purified N-methylpyrrolidone (NMP) to a concentration of up to about 8 wt % under nitrogen atmosphere. The number-average molecular weight of the poly-o-anisidine obtained from the GPC measurement of the solution was about 15,000 as calculated using polystyrene as a molecular-weight standard material.

Next, a positive electrode comprising poly-o-anisidine and solid polymer electrolyte was fabricated in the same manner as in Example 28 except that 8 wt % of the poly-o-anisidine/NMP solution was used instead of the 5 wt % polyaniline/NMP solution used in Example 28.

EXAMPLE 31

Fabrication of secondary battery comprising poly-o-anisidine, lithium and solid polymer electrolyte A solid-state lithium/poly-o-anisidine secondary battery was produced in the same manner as in Example 29 except that the positive electrode comprising poly-o-anisidine (62 mg) prepared in Example 30 was used instead of the polyaniline electrode.

This battery was subjected to repeated charging and discharging at an operating voltage of 1.8 to 3.8 V and at a constant current density of 0.1 mA. As a result, it revealed that the maximum discharge capacity was 1.1 mAh, and a cycle life until the capacity decreased to 50% was 210 times.

EXAMPLE 32

Fabrication of a secondary battery comprising graphite fiber, polyaniline and solid polymer electrolyte A solid-state graphite fiber/polyaniline secondary battery was produced in the same manner as in Example 29 except that the graphite (C/Li=12/1) negative electrode prepared in Example 25 was used instead of the lithium foil.

This battery was subjected to repeated charging and discharging at an operating voltage of 1.5 to 3.8 V and at a constant current density of 0.1 mA. As a result, it revealed that the maximum discharge capacity was 1.5 mAh, and a cycle life until the capacity decreased to 50% was 300 times.

EXAMPLE 33

2.10 g of MCOA (550) and 0.51 g of ACAC (600) synthesized in Examples 5 and 6, 1.6 g of propylene carbonate (PC), 1.6 g of ethylene carbonate (EC) and 0.90 g of ethyltributylammnonium perchlorate (EBAP) were mrixed well under argon atmosphere to produce a polymerizable monomer mixture comprising MCOA(550)/ACAC (600)/PC/EC/EBAP as a viscous liquid.

Under argon atmosphere, a portion of the polymerizable monomer mixture thus obtained was applied on a glass plate, and heated at 100° C. for 1 hour to produce a MCOA (550)/ACAC (600) copolymer(one of the above-mentioned (M)AXE polymer or (M)ACE polymer)/PC/EC/EBPA composite as a transparent, free-standing film of about 300 μm thickness. The ionic conductivities of the film measured at 25° C. and −10° C. by an impedance method were $3.0 \times 10^{-3}$ S/cm and $1.0 \times 10^{-3}$ S/cm, respectively.

EXAMPLE 34
Production of an activated carbon electrode

Coconut shell activated carbon and the polymerizable monomer mixture prepared in Example 33 were mixed in a proportion by weight of 1:1 under an argon atmosphere, and a portion of the mixture thus obtained was applied on a stainless steel foil to an area of 1 cm×1 cm and a thickness of about 150 μm. Further, the coated foil was heated at about 100° C. for 1 hour for polymerization to produce an activated carbon/solid polymer electrolyte composite electrode (13 mg).

EXAMPLE 35
Fabrication of a solid-state electric double layer capacitor

In a glove box under an argon atmosphere, the activated carbon electrode (13 mg) of an area of 1 cm×1 cm produced in Example 34 was covered with a polyimide film of 10 μm thick as a spacer at each edge portion (1 mm width) thereof. Next, the polymerizable monomer mixture (15 mg) produced in Example 33 was applied on the electrode, and then another activated carbon electrode was tightly fitted thereto. The resulting frame was heated at 100° C. for 1 hour, and the edge portions of the battery were sealed with an epoxy resin to produce a solid-state electric double layer capacitor having a cross-sectional structure as shown in FIG. 3.

This capacitor was subjected to repeated charging and discharging at an operating voltage of 0 to 2.5 V and at a current of 0.1 mA. As a result, it revealed that the maximum discharge capacity was 200 mF. When the charging and discharging were repeated 50 times under this condition, there was no substantial change in the capacity.

EXAMPLE 36
Fabrication of a solid-state electric double layer capacitor

A polymerizable monomer mixture was prepared in the same manner as in Example 33 except that 0.3 g of lithium perchlorate ($LiClO_4$) was used instead of the salt EBAP.

A solid electric double layer capacitor was fabricated in the same manner as in Example 35 except that a portion of the polymerizable monomer mixture thus obtained was used.

This capacitor was subjected to repeated charging and discharging at an operation voltage of 0 to 2.0 V and at a current of 0.1 mA. As a result, it revealed that the maximum discharge capacity was 150 mF. When the charging and discharging were repeated 50 times under this condition, there was no substantial change in the capacity.

EXAMPLE 37
Production of an acetylene black electrode

Acetylene black and the polymerizable monomer mixture as used in Example 33 were mixed in a proportion by weight of 6:4 under an argon atmosphere, and the resulting mixture was applied on a stainless steel foil to an area of 1 cm×1 cm and a thickness of about 150 μm. Further, the coated foil was heated at about 100° C. for 1 hour for polymerization to produce an electrode comprising acetylene black and solid polymer electrolyte (14 mg).

EXAMPLE 38
Fabrication of a solid-state electric double layer capacitor

A solid-state electric double layer capacitor was fabricated in the same manner as in Example 35 except that the electrode (14 mg) comprising acetylene black and solid polymer electrolyte produced in Example 37 was used.

This capacitor was subjected to repeated charging and discharging at an operating voltage of 0 to 2.5 V and at a current of 0.1 mA. As a result, it revealed that the maximum discharge capacity was 50 mF. When the charging and discharging were repeated 50 times under this condition, there was no substantial change in the capacity.

EXAMPLE 39
(1) Synthesis of N-methacryloylcarbamic acid ω-methyloligooxyethyl ester (MME (550)) (a compound represented by the general formula (IIA) wherein $R^1$ and $R^4$ are $CH_3$, $R^3$ is $(CH_2)_2$ and z is 0)

0.1 mol (11.1 g) of N-methacryloylisocyanate (MAI) and 0.1 mol (55 g) of monomethyloligoethylene glycol having an average molecular weight of 550 were dissolved in 100 ml of sufficiently purified THF under a nitrogen atmosphere, and thereafter, 0.66 g of dibutyltin dilaurate was added thereto. Reaction was run at 50° C. for about 3 hours to obtain MME (550) as a colorless viscous liquid. $^1$H-NMR, IR and elemental analyses were made, and the results revealed that MAI and monomethyloligoethylene glycol reacted in a molar proportion of 1:1, and that the isocyanate group in MAI disappeared and a urethane bond was formed.

(2) Production and evaluation of MME (550)-based solid polymer electrolyte 1.40 g of MME (550) was dissolved in 100 ml of THF and 0.14 g of $LiCF_3SO_3$ was added thereto and mixed well. Then, THF was removed at room temperature under reduced pressure. Thus, a MME (550)/$LiCF_3SO_3$ mixture (polymerizable monomer mixture) was obtained as a viscous liquid. Under argon atmosphere, a portion of the mixture thus obtained was applied on a glass plate, and heated at 100° C. for 1 hour to produce a MME (550) polymer/$LiCF_3SO_3$ composite as a transparent film of about 200 μm thickness. The ionic conductivity of the film measured at 25° C. by an impedance method was $8 \times 10^{-5}$ S/cm.

EXAMPLE 40
(1) Synthesis of N-methacryloylcarbamic acid N-methacryloylcarbamoyloligooxyethyl ester (MEM (1000)) (A compound represented by the general formula (IIA) wherein $R^1$ is $CH_3$, $R^3$ is $(CH_2)_2$, $R^4$ is CONHOCOC$(CH_3)$=$CH_2$ and z is 0)

0.2 mol (22.2 g) of N-methacryloylisocyanate (MAI) and 0.1 mol (100 g) of oligoethylene glycol having an average molecular weight of 1000 were dissolved in 100 ml of sufficiently purified THF under a nitrogen atmosphere, and thereafter, 0.66 g of dibutyltin dilaurate was added thereto. Reaction was run at 50° C. for about 3 hours to obtain MEM (1000) as a colorless viscous liquid. $^1$H-NMR, IR and elemental analyses were made, and the results revealed that MAI and oligoethylene glycol reacted in a molar proportion of 2:1, and that the isocyanate group in MAI disappeared and urethane bonds were formed.

(2) Production and evaluation of MME (550)/MEM (1000) copolymer-based solid polymer electrolyte 2.00 g of MME (550) synthesized in Example 39 and 0.40 g of MEM (1000) synthesized in Example 40 (1) were dissolved in 20 ml of THF and 0.14 g of $LiCF_3SO_3$ was added thereto and mixed well. Then, THF was removed at room temperature under reduced pressure. Thus, a MME (550)/MEM (1000)/$LiCF_3SO_3$ mixture (polymerizable monomer mixture) was obtained as a viscous liquid. Under argon atmosphere, a portion of the mixture thus obtained was applied on a glass plate, and heated at 100° C. for 1 hour to produce a MME (550)/MEM (1000) copolymer/

$LiCF_3SO_3$ composite as a transparent, free-standing film of about 100 μm thickness. The ionic conductivity of the film measured at 25° C. by an impedance method was $1 \times 10^{-5}$ S/cm.

EXAMPLE 41

A solid polymer electrolyte was produced and fabricated in the same manner as in Example 39, except for using 0.15 g of $NaCF_3SO_3$ instead of $LiCF_3SO_3$ used in Example 39. The ionic conductivity of the thus fabricated film measured at 25° C. by an impedance method was $7 \times 10^{-5}$ S/cm.

EXAMPLE 42

A solid polymer electrolyte was produced and fabricated in the same manner as in Example 39, except for using 0.11 g of LiI instead of $LiCF_3SO_3$ used in Example 39. The ionic conductivity of the thus fabricated film measured at 25° C. by an impedance method was $1 \times 10^{-4}$ S/cm.

EXAMPLE 43

(1) Synthesis of N-methacryloylcarbamic acid N-methacryloylcarbamoyloligooxyethyl/oligooxypropyl ester (MEPM (800)) (a compound represented by the general formula (IIA) wherein $R^1$ is $CH_3$, $R^3$ is $(CH_2)_2$ and/or $CH(CH_3)CH_2$, $R^4$ is $CONHOCOC(CH_3)=CH_2$ and z is 0)

0.2 mol (22.2 g) of N-methacryloylisocyanate (MAI) and 0.1 mol (80 g) of oligoethylene glycol/propylene glycol copolymer having an average molecular weight of 800 were dissolved in 100 ml of sufficiently purified THF under a nitrogen atmosphere, and thereafter, 0.66 g of dibutyltin dilaurate was added thereto. Reaction was run at 50° C. for about 3 hours to obtain MEPM (800) as a colorless gel-like solid. $^1$H-NMR, IR and elemental analyses were made, and the results revealed that MAI and oligoethylene glycol/propylene glycol reacted in a molar proportion of 2:1, and that the isocyanate group in MAI disappeared and urethane bonds were formed.

(2) Production and evaluation of MME (550)/MEPM (800) copolymer based solid polymer electrolyte 2.00 g of MME (550) synthesized in Examples 39 and 0.40 g of MEPM (800) were dissolved in 20 ml of THF and 0.14 g of $LiCF_3SO_3$ was added thereto and mixed well. Then, THF was removed at room temperature under reduced pressure. Thus, a MME (550)/MEPM (800)/$LiCF_3SO_3$ mixture (polymerizable monomer mixture) was obtained as a viscous liquid. Under argon atmosphere, a portion of the mixture thus obtained was applied on a glass plate, and heated at 100° C. for 1 hour to produce a MME (550)/MEPM (800) copolymer/$LiCF_3SO_3$ composite as a transparent, free-standing film of about 100 μm thickness. The ionic conductivity of the film measured at 25° C. by an impedance method was $1 \times 10^{-4}$ S/cm.

EXAMPLE 44

(1) Synthesis of N-methacryloylcarbamic acid ω-methyloligooxypropyl ester (MMP (440)) (A compound represented by the general formula (IIA) wherein $R^1$ and $R^4$ are $CH_3$ and $R^3$ is $CH_2CH(CH_3)$ and z is 0).

0.1 mol (11.1 g) of N-methacryloylisocyanate (MAI) and 0.1 mol (44 g) of monomethyloligopropylene glycol having an average molecular weight of 440 were dissolved in 100 ml of sufficiently purified THF under a nitrogen atmosphere, and thereafter, 0.66 g of dibutyltin dilaurate was added thereto. Reaction was run at 50° C. for about 3 hours to obtain MMP (440) as a pale yellow viscous liquid. $^1$H-NMR, IR and elemental analyses were made, and the results revealed that MAI and monomethyloligopropylene glycol reacted in a molar proportion of 1:1, and that the isocyanate group in MAI disappeared and a urethane bond was formed.

(2) Production and evaluation of MMP (440)/MEM (1000) copolymer-based solid polymer electrolyte 1.84 g of MMP (440) and 0.40 g of MEM (1000) synthesized in Example 40 were dissolved in 20 ml of THF and 0.14 g of $LiCF_3SO_3$ was added thereto and mixed well. Then, THF was removed at room temperature under reduced pressure. Thus, a MMP (440)/MEM (1000)/$LiCF_3SO_3$ mixture (polymerizable monomer mixture) was obtained as a viscous liquid. Under argon atmosphere, a portion of the mixture thus obtained was applied on a glass plate, and heated at 100° C. for 1 hour to produce a MMP (440)/MEM (1000) copolymer/$LiCF_3SO_3$ composite as a transparent, free-standing film of about 100 μm thickness. The ionic conductivity of the film measured at 25° C. by an impedance method was $2 \times 10^{-5}$ S/cm.

EXAMPLE 45

A solid polymer electrolyte as a transparent, free-standing film of about 100 μm thickness was produced and fabricated in the same manner as in Example 43, except for using 0.30 g of tetrabutylammonium tetrafluoroborate (TBAB) instead of $LiCF_3SO_3$ used in Example 43. The ionic conductivity of the thus fabricated film measured at 25° C. by an impedance method was $7 \times 10^{-5}$ S/cm.

EXAMPLE 46

A solid polymer electrolyte was produced and fabricated in the same manner as in Example 43, except for using 0.30 g of AgI instead of $LiCF_3SO_3$ used in Example 43. The ionic conductivity of the thus fabricated film measured at 25° C. by an impedance method was $9 \times 10^{-4}$ S/cm.

EXAMPLE 47

1.40 g of MME (550) and 0.40 g of MEM (1000) synthesized in Examples 39 and 40, 1.5 g of propylene carbonate (PC) and 0.28 g of $LiCF_3SO_3$ were mixed well under argon atmosphere. Thus, a MME (550)/MEM (1000)/PC/$LiCF_3SO_3$ mixture (polymerizable monomer mixture) was obtained as a viscous liquid. Under argon atmosphere, a portion of the mixture thus obtained was applied on a glass plate, and heated at 100° C. for 1 hour to produce a MME (550)/MEM (1000) copolymer/PC/$LiCF_3SO_3$ composite as a transparent, free-standing film of about 300 μm thickness. The ionic conductivity of the film measured at 25° C. by an impedance method was $1 \times 10^{-3}$ S/cm.

EXAMPLE 48

2.00 g of MME (550) and 0.51 g of MEM (1000) synthesized in Examples 39 and 40, 2.0 g of propylene carbonate (PC), 2.0 g of ethylene carbonate (EC) and 0.40 g of $LiBF_4$ were mixed well under argon atmosphere. Thus, a polymerizable monomer mixture consisting of a MME (550)/MEM (1000)/PC/EC/$LiBF_4$ mixture was obtained as a viscous liquid.

Under argon atmosphere, a portion of the mixture thus obtained was applied on a glass plate, and heated at 100° C. for 1 hour to produce a MME (550)/MEM (1000) copolymer/PC/EC/$LiBF_4$ composite as a transparent, free-standing film of about 300 μm thickness. The ionic conductivity of the film measured at 25° C. and −10° C. by an impedance method was $3 \times 10^{-3}$ S/cm and $1 \times 10^{-3}$ S/cm, respectively.

EXAMPLE 49

(1) Synthesis of 1-methyl-2-methacryloyloxyethylcarbamic acid ω-methyloligooxyethyl ester (MMME (550)) (a compound represented by the general formula (IIA) wherein $R^1$ and $R^4$ are $CH_3$, $R^3$ is $(CH_2)_2$, x is 1, y is 1 and z is 1)

0.1 mol (16.9 g) of 1-methyl-2-methacryloyloxyethylisocyanate (MMOI) and 0.1 mol (55 g) of monomethyloligoethylene glycol having an average molecular weight of 550 were dissolved in 100 ml of sufficiently purified THF under a nitrogen atmosphere, and thereafter, 0.66 g of dibutyltin dilaurate was added thereto. Reaction was run at 50° C. for about 3 hours to obtain MMME (550) as a colorless viscous liquid. $^1$H-NMR, IR and elemental analyses were made, and the results revealed that MMOI and monomethyloligoethylene glycol reacted in a molar proportion of 1:1, and that the isocyanate group in MMOI disappeared and a urethane bond was formed.

(2) Production and evaluation of MMME (550)/MEM (1000) copolymer-based solid polymer electrolyte 2.00 g of MMME (550) and 0.40 g of MEM (1000) synthesized in Example 40 were dissolved in 20 ml of THF and 0.09 g of $LiBF_4$ was added thereto and mixed well. Then, THF was removed at room temperature under reduced pressure. Thus, a MMME (550)/MEM (1000) $LiBF_4$ mixture (polymerizable monomer mixture) was obtained as a viscous liquid. Under argon atmosphere, a portion of the mixture thus obtained was applied on a glass plate, and heated at 100° C. for 1 hour to produce a MMME (550)/MEM (1000) copolymer/$LiBF_4$ composite as a transparent and free-standing film of about 100 μm thickness. The ionic conductivity of the film measured at 25° C. by an impedance method was $2 \times 10^{-5}$ S/cm.

EXAMPLE 50

(1) Synthesis of 3-acryloyloxypropylcarbamic acid ω-methyloligooxyethyl ester (APME (550)) (a compound represented by the general formula (IIA) wherein $R^1$ is H, $R^3$ is $(CH_2)_2$, $R^4$ is $CH_3$, x is 3, y is 0 and z is 1)

0.1 mol (15.5 g) of 3-acryloyloxypropylisocyanate (API) and 0.1 mol (55 g) of monomethyloligoethylene glycol having an average molecular weight of 550 were dissolved in 100 ml of sufficiently purified THF under a nitrogen atmosphere, and thereafter, 0.66 g of dibutyltin dilaurate was added thereto. Reaction was run at 50° C. for about 3 hours to obtain APME (550) as a colorless viscous liquid. $^1$H-NMR, IR and elemental analyses were made, and the results revealed that API and monomethyloligoethylene glycol reacted in a molar proportion of 1:1, and that the isocyanate group in API disappeared and a urethane bond was formed.

(2) Production and evaluation of APME (550)/MEM (1000) copolymer-based solid polymer electrolyte 2.00 g of APME (550) and 0.40 g of MEM (1000) synthesized in Example 40 were dissolved in 20 ml of THF and 0.09 g of $LiBF_4$ was added thereto and mixed well. Then, THF was removed at room temperature under reduced pressure. Thus, an APME (550)/MEM (1000)/$LiBF_4$ mixture (polymerizable monomer mixture) was obtained as a viscous liquid. Under argon atmosphere, a portion of the mixture thus obtained was applied on a glass plate, and heated at 100° C. for 1 hour to produce an APME (550)/MEM (1000) copolymer/$LiBF_4$ composite as a transparent and free-standing film of about 100 μm thickness. The ionic conductivity of the film measured at 25° C. by an impedance method was $1 \times 10^{-5}$ S/cm.

EXAMPLE 51

2.10 g of APME (550) synthesized in Example 50 and 0.40 g of MEM (1000) synthesized in Example 40, 1.3 g of propylene carbonate (PC), 1.3 g of ethylene carbonate (EC) and 0.56 g of $LiBF_4$ were mixed well under argon atmosphere. Thus, an APME (550)/MEM (1000)/PC/EC/$LiBF_4$ mixture (polymerizable monomer mixture) was obtained as a viscous liquid.

Under argon atmosphere, a portion of the polymerizable monomer mixture thus obtained was applied on a glass plate, and heated at 100° C. for 1 hour to produce an APME (550)/MEM (1000) copolymer/PC/EC/$LiBF_4$ composite as a transparent, free-standing film of about 300 μm thickness. The ionic conductivity of the film measured at 25° C. and −10° C. by an impedance method was $2.5 \times 10^{-3}$ S/cm and $0.8 \times 10^{-3}$ S/cm respectively.

EXAMPLE 52

(1) Synthesis of methacryloyloxymethylcarbamic acid ωw-methyloligooxyethyl ester (MMME (550)) (a compound represented by the general formula (IIA) wherein $R^1$ and $R^4$ are $CH_3$, $R^3$ is $(CH_2)_2$, x is 1, y is 0 and z is 1)

0.1 mol (14.1 g) of methacryloyloxymethylisocyanate (MMI) and 0.1 mol (55 g) of monomethyloligoethylene glycol having an average molecular weight of 550 were dissolved in 100 ml of sufficiently purified THF under a nitrogen atmosphere, and thereafter, 0.66 g of dibutyltin dilaurate was added thereto. Reaction was run at 50° C. for about 3 hours to obtain MMME (550) as a colorless viscous liquid. $^1$H-NMR, IR and elemental analyses were made, and the results revealed that MMI and monomethyloligoethylene glycol reacted in a molar proportion of 1:1, and that the isocyanate group in MMI disappeared and a urethane bond was formed.

(2) Production and evaluation of MMME (550)/MEM (1000) copolymer-based solid polymer electrolyte 2.00 g of MMME (550) and 0.40 g of MEM (1000) synthesized in Example 40 were dissolved in 20 ml of THF and 0.09 g of $LiBF_4$ was added thereto and mixed well. Then, THF was removed at room temperature under reduced pressure. Thus, a MMME (550)/MEM (1000)/$LiBF_4$ mixture (polymerizable monomer mixture) was obtained as a viscous liquid. Under argon atmosphere, a portion of the mixture thus obtained was applied on a glass plate, and heated at 100° C. for 1 hour to produce a MMME (550)/MEM (1000) copolymer/$LiBF_4$ composite as a transparent and free-standing film of about 100 μm thickness. The ionic conductivity of the film measured at 25° C. by an impedance method was $2 \times 10^{-5}$ S/cm.

EXAMPLE 53

Production of a positive electrode comprising cobalt oxide and solid polymer electrolyte 11 g of $Li_2CO_3$ and 24 g of $Co_3O_4$ were mixed well and heated at 800° C. for 24 hours under an oxygen atmosphere, followed by pulverizing to obtain $LiCoO_2$ powder. The $LiCoO_2$ powder and the polymerizable monomer mixture produced in Example 48 were mixed in a proportion by weight of 7:3 under an argon atmosphere, and the mixture was applied on a stainless steel foil in an area of 1 cm×1 cm and to a thickness of about 200 μm. Further, the coated foil was heated at about 100° C. for 1 hour for polymerization to produce a cobalt oxide/solid polymer electrolyte composite positive electrode (65 mg).

EXAMPLE 54

Fabrication of secondary battery comprising solid polymer electrolyte

In a glove box under an argon atmosphere, a lithium foil of 75 μm thickness was cut to a piece of 1 cm×1 cm (5.3 mg). At each edge portion (1 mm width) of the foil was covered with a polyimide film of 10 μm thickness as a spacer. Next, 15 mg of the polymerizable monomer mixture produced in Example 48 was applied on the lithium foil, and then, the cobalt oxide positive electrode produced in Example 53 was tightly fitted onto the mixture-coated surface of the lithium foil. The resulting structure was heated at 100° C. for 1 hour, and the edge portions of the battery were sealed with an epoxy resin to produce a solid-state lithium/cobalt oxide secondary battery having a structure same as shown in FIG. 2.

This battery was subjected to repeated charging and discharging at an operating voltage of 2.0 to 4.3 V and at a constant current of 0.1 mA. As a result, it revealed that the maximum discharge capacity was 4.0 mAh, and a cycle life until the capacity decreased to 50% was 153 times.

EXAMPLE 55

2.00 g of MME (550) and 0.51 g of MEM (1000) synthesized in Examples 39 and 40, 2.0 g of propylene carbonate (PC), 2.0 g of ethylene carbonate (EC) and 0.90 g of ethyltributylammonium perchlorate (EBAP) were mixed well under argon atmosphere. Thus, a polymerizable monomer mixture consisting of a MME (550)/MEM (1000)/PC/EC/EBAP mixture was obtained as a viscous liquid.

Under argon atmosphere, a portion of the polymerizable monomer mixture thus obtained was applied on a glass plate, and heated at 100° C. for 1 hour to produce a MME (550)/MEM (1000) copolymer/PC/EC/EBAP composite as a transparent, free-standing film of about 300 µm thickness. The ionic conductivity of the film measured at 25° C. and −10° C. by an impedance method was $3.5 \times 10^{-3}$ S/cm and $1.0 \times 10^{-3}$ S/cm, respectively.

EXAMPLE 56

Production of an activated carbon electrode

Coconut shell activated carbon and the polymerizable monomer mixture prepared in Example 55 were mixed in a proportion by weight of 1:1 under an argon atmosphere, and a portion of the mixture thus obtained was applied on a stainless steel foil to an area of 1 cm×1 cm and a thickness of about 150 µm. Further, the coated foil was heated at about 100° C. for 1 hour for polymerization to produce an activated carbon/solid polymer electrolyte composite electrode (13 mg).

EXAMPLE 57

Fabrication of a solid-state electric double layer capacitor

In a glove box under an argon atmosphere, the activated carbon electrode (13 mg of an area of 1 cm×1 cm produced in Example 56 was covered with a polyimide film of 10 µm thick as a spacer at each edge portion ( 1 mm width) thereof. Next, a portion of the polymerizable monomer mixture (15 mg) produced in Example 55 was applied on the electrode, and then another electrode was tightly fitted thereto. The resulting frame was heated at 100° C. for 1 hour, and the edge portions of the capacitor were sealed with an epoxy resin to produce a solid-state electric double layer capacitor having a cross-sectional structure as shown in FIG. 3.

This capacitor was subjected to repeated charging and discharging at an operating voltage of 0 to 2.5 V and at a current of 0.1 mA. As a result, it revealed that the maximum discharge capacity was 210 mF. When the charging and discharging were repeated 50 times under this condition, there was no substantial change in the capacity.

Example 58

(1) Synthesis of compound 2

(Compound 1)    (MAI)    (Compound 2)

$$[R^1]: \text{+CH}_2\text{CH}_2\text{O+}_m\text{+CHCH}_2\text{O+}_n\text{H}$$
$$\phantom{[R^1]: \text{+CH}_2\text{CH}_2\text{O+}_m\text{+}}\text{CH}_3$$
$$[R^2]: \text{+CH}_2\text{CH}_2\text{O+}_m\text{+CHCH}_2\text{O+}_n\text{C—NH—C—C=CH}_2$$
$$\phantom{[R^2]:}\text{CH}_3 \quad \text{O} \quad \text{O} \quad \text{CH}_3$$

3.89 g of MAI and 57.7 g of compound 1 (KOH value: 34.0 mg/g, m/n=4) were dissolved in 100 ml of sufficiently purified THF under a nitrogen atmosphere, and thereafter, 0.44 g of dibutyltin dilaurate was added thereto. Reaction was run at 25° C. for about 15 hours to obtain compound 2 as a colorless viscous liquid. $^1$H-NMR, IR and elemental analyses were made, and the results revealed that MAI and compound 1 reacted in a molar proportion of 3:1, and that the isocyanate group in MAI disappeared and urethane bonds were formed.

(2) Production and evaluation of compound 2-based solid polymer electrolyte 1.46 g of compound 2 was dissolved in 100 ml of THF and 0.14 g of LiCF$_3$SO$_3$ was added thereto and mixed well. Then, THF was removed at room temperature under reduced pressure. Thus, a compound 2/LiCF$_3$SO$_3$ mixture (polymerizable monomer mixture) was obtained as a viscous liquid. Under argon atmosphere, a portion of the mixture thus obtained was applied on a glass plate, and heated at 100° C. for 1 hour to produce a compound 2 polymer/LiCF$_3$SO$_3$ composite as a transparent free-standing film of about 30 µm thickness. The ionic conductivity of the film measured at 25° C. by an impedance method was $2 \times 10^{-5}$ S/cm.

EXAMPLE 59

(1) Synthesis of compound 4

(Compound 3)    (MOI)    (Compound 4)

wherein
any two of the three [R$^3$] groups mean
—(CH$_2$CH$_2$O)$_m$—(CHCH$_2$O)$_n$—H
                        |
                        CH$_3$
and rest [R$^3$] groups means
+CH$_2$CH$_2$O+$_m$+CHCH$_2$O+$_n$CH$_3$ and
                     |
                    CH$_3$
any two of the three [R$^4$] groups mean
+CH$_2$CH$_2$O+$_m$+CHCH$_2$O+$_n$C—NH—CH$_2$CH$_2$O—C—C=CH$_2$
                    CH$_3$    O             O   CH$_3$
and rest [R$^4$] group means
+CH$_2$CH$_2$O+$_m$+CHCH$_2$O+$_n$CH$_3$
                    CH$_3$ 2.42 g of MOI and 57.7 g of compound 3 (KOH value: 22.7 mg/g m/n=5) were dissolved in 100 ml of sufficiently purified THF under a nitrogen atmosphere, and thereafter, 0.29 g of dibutyltin dilaurate was added thereto. Reaction was run at 25° C. for about 15 hours to obtain compound 4 as a colorless viscous liquid. $^1$H-NMR, IR and elemental analyses were made, and the results revealed that MOI a nd compound 3 reacted in a molar proportion of 2:1, and that the isocyanate group in MOI disappeared and urethane bonds were formed.

(2) Production and evaluation of compound 4-based solid polymer electrolyte 1.46 g of compound 4 was dissolved in 100 ml of THF and 0.14 g of LiCF$_3$SO$_3$ was added thereto and mixed well. Then, THF was removed at room temperature under reduced pressure. Thus, a compound 4/LiCF$_3$SO$_3$ mixture (polymerizable monomer mixture) was obtained as a viscous liquid. Under argon atmosphere, a portion of the mixture thus obtained was applied on a glass plate, and heated at 100° C. for 1 hour to produce a compound 4 polymer/ LiCF$_3$SO$_3$ composite as a transparent free-standing film of about 30 μm thickness. The ionic conductivity of the film measured at 25° C. by an impedance method was 7×10$^{-5}$ S/cm.

EXAMPLE 60

A solid polymer electrolyte was produced and fabricated in the same manner as in Example 58, except for using 0.15 g of NaCF$_3$SO$_3$ instead of LiCF$_3$SO$_3$ used in Example 58. The ionic conductivity of the thus fabricated film measured at 25° C. by an impedance method was 3×10$^{-5}$ S/cm.

EXAMPLE 61

A solid polymer electrolyte was produced and fabricated in the same manner as in Example 58, except for using 0.11 g of LiI instead of LiCF$_3$SO$_3$ used in Example 58. The ionic conductivity of the thus fabricated film measured at 25° C. by an impedance method was 3×10$^{-4}$ S/cm.

EXAMPLE 62

Production and evaluation of a [MCOA (550)/compound 2] copolymer-based solid polymer electrolyte 1.20 g of MCOA (550) synthesized in Example 5 and 1.20 g of compound 2 synthesized in Example 58 were dissolved in 50 ml of THF and 0.14 g of LiCF3SO3 was added thereto and mixed well. Then, THF was removed at room temperature under reduced pressure. Thus, a MCOA (550)/ compound 2/LiCF$_3$SO$_3$ mixture (polymerizable monomer mixture) was obtained as a viscous liquid. Under argon atmosphere, a portion of the mixture thus obtained was applied on a glass plate, and heated at 100° C. for 1 hour to produce a [MCOA (550)/compound 2] copolymer/ LiCF$_3$SO$_3$ composite as a transparent, free-standing film of about 30 μm thickness. The ionic conductivity of the film measured at 25° C. by an impedance method was 1×10$^{-4}$ S/cm.

EXAMPLE 63

(1) Synthesis of compound 6

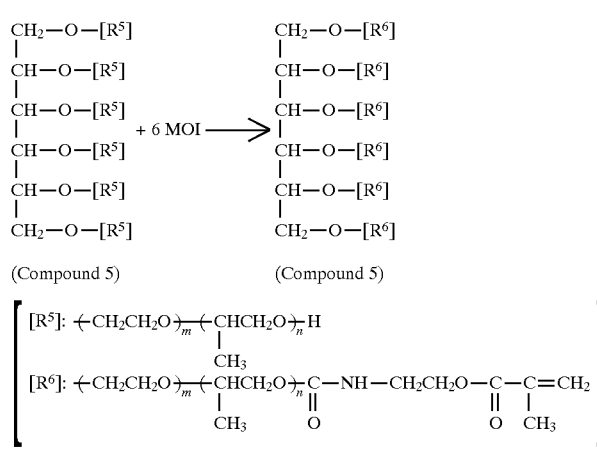

10.86 g of MOI and 57.7 g of compound 5 (KOH value: 68.0 mg/g, m/n=6) were dissolved in 100 ml of sufficiently purified THF under a nitrogen atmosphere, and thereafter, 0.44 g of dibutyltin dilaurate was added thereto. Reaction was run at 25° C. for about 15 hours to obtain compound 6 as a colorless viscous liquid. $^1$H-NMR, IR and elemental analyses were made, and the results revealed that MOI and compound 5 reacted in a molar proportion of 6:1, and that the isocyanate group in MOI disappeared and urethane bonds were formed.

(2) Production and evaluation of a [MCOA (550)/compound 6] copolymer-based solid polymer electrolyte 1.20 g of MCOA (550) synthesized in Example 5 and 1.20 g of compound 6 were dissolved in 100 ml of THF and 0.14 g of LiCF$_3$SO$_3$ was added thereto and mixed well. Then, THF was removed at room temperature under reduced pressure. Thus, an MCOA (550)/compound 6/LiCF$_3$SO$_3$ mixture (polymerizable monomer mixture) was obtained as a viscous liquid. Under argon atmosphere, a portion of the mixture thus obtained was applied on a glass plate, and heated at 100° C. for 1 hour to produce a [MCOA (550)/ compound 6] copolymer/LiCF$_3$SO$_3$ composite as a transparent, free-standing film of about 30 μm thickness. The ionic conductivity of the film measured at 25° C. by an impedance method was 8×10$^{-5}$ S/cm.

EXAMPLE 64

(1) Synthesis of compound 8

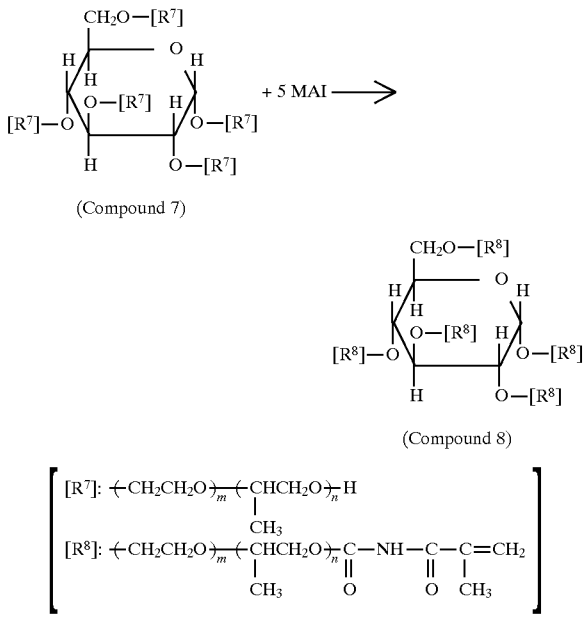

(Compound 7)

(Compound 8)

$$[R^7]: -(CH_2CH_2O)_m-(CHCH_2O)_n-H$$
$$\qquad\qquad\qquad\qquad | \qquad\quad CH_3$$
$$[R^8]: -(CH_2CH_2O)_m-(CHCH_2O)_n-C-NH-C-C=CH_2$$
$$\qquad\qquad\qquad\qquad | \qquad\quad\; \| \qquad\; \| \;\;\; |$$
$$\qquad\qquad\qquad\qquad CH_3 \qquad O \qquad O\;\;CH_3$$

7.78 g of MAI and 57.7 g of compound 7 (KOH value: 68.0 mg/g, m/n=6) were dissolved in 100 ml of sufficiently purified THF under a nitrogen atmosphere, and thereafter, 0.44 g of dibutyltin dilaurate was added thereto. Reaction was run at 25° C. for about 15 hours to obtain compound 8 as a colorless viscous liquid. $^1$H-NMR, IR and elemental analyses were made, and the results revealed that MAI and compound 7 reacted in a molar proportion of 5:1, and that the isocyanate group in MAI disappeared and urethane bonds were formed.

(2) Production and evaluation of a [compound 8/compound 2] copolymer-based solid polymer electrolyte 1.20 g of compound 8 synthesized in Example 5 and 1.20 g of compound 2 synthesized in Example 58 were dissolved in 100 ml of THF and 0.14 g of $LiCF_3SO_3$ was added thereto and mixed well. Then, THF was removed at room temperature under reduced pressure. Thus, a compound 8/compound 2/$LiCF_3SO_3$ mixture (polymerizable monomer mixture) was obtained as a viscous liquid. Under argon atmosphere, a portion of the mixture thus obtained was applied on a glass plate, and heated at 100° C. for 1 hour to produce a [compound 8/compound 2] copolymer/$LiCF_3SO_3$ composite as a transparent, free-standing film of about 20 μm thickness. The ionic conductivity of the film measured at 25° C. by an impedance method was $8\times10^{-5}$ S/cm.

EXAMPLE 65

A solid polymer electrolyte was produced and fabricated in the same manner as in Example 64, except for using 0.30 g of AgI instead of $LiCF_3SO_3$ used in Example 64. The ionic conductivity of the thus fabricated film measured at 25° C. by an impedance method was $3\times10^{-4}$ S/cm.

EXAMPLE 66

1.46 g of MCOA (550) synthesized in Example 5, 0.40 g of compound 2 synthesized in Example 58, 1.5 g of propylene carbonate (PC), and 0.28 g of $LiCF_3SO_3$ were mixed well under an argon atmosphere to obtain a MCOA (550)/compound 2/PC/$LiCF_3SO_3$ mixture (polymerizable monomer mixture) as a viscous liquid. Under argon atmosphere, a portion of the mixture thus obtained was applied on a glass plate, and heated at 100° C. for 1 hour to produce a [MCOA (550)/compound 2] copolymer/PC/$LiCF_3SO_3$ composite as a transparent, free-standing film of about 50 μm thickness. The ionic conductivity of the film measured at 25° C. by an impedance method was $2\times10^{-3}$ S/cm.

EXAMPLE 67

A [MCOA (550)/compound 2] copolymer/TG/$LiCF_3SO_3$ composite as a transparent, free-standing film of about 50 μm thickness was fabricated in the same manner as in Example 66, except for using tetraglyme (TG) instead of propylene carbonate used in Example 66. The ionic conductivity of the film measured at 25° C. by an impedance method was $7\times10^{-4}$ S/cm.

EXAMPLE 68

A [MCOA (550)/compound 2] copolymer/DEC/$LiCF_3SO_3$ composite as a transparent, free-standing film of about 50 μm thickness was fabricated in the same manner as in Example 66, except for using diethyl carbonate (DEC) instead of propylene carbonate used in Example 66. The ionic conductivity of the film measured at 25° C. by an impedance method was $3\times10^{-3}$ S/cm.

EXAMPLE 69

1.30 g of MCOA (550) synthesized in Example 5, 0.20 g of compound 2 synthesized in Example 58, 1.3 g of propylene carbonate (PC), 1.3 g of ethylene carbonate (EC) and 0.56 g of $LiBF_4$ were mixed well under an argon atmosphere to produce a polymerizable monomer mixture consisting of a MCOA (550)/compound 2/PC/EC/$LiBF_4$ mixture as a viscous liquid. Under argon atmosphere, a portion of the mixture thus obtained was applied on a glass plate, and heated at 100° C. for 1 hour to produce a [MCOA (550)/compound 2] copolymer/PC/EC/$LiBF_4$ composite as a transparent, free-standing film of about 50 μm thickness. The ionic conductivity of the film measured at 25° C. and $-10°$ C. by an impedance method was $3\times10^{-3}$ S/cm and $1\times10^{-3}$ S/cm, respectively.

EXAMPLE 70

(1) Synthesis of compound 10

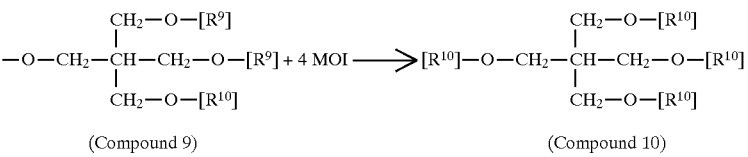

(Compound 9)　　　　　　　　　　(Compound 10)

-continued

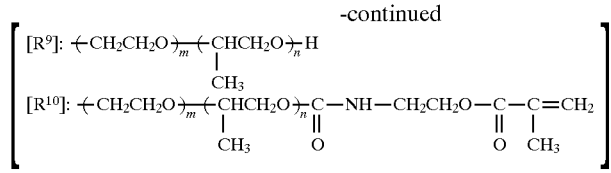

8.53 g of MOI and 55.0 g of compound 9 (KOH value: 56.0 mg/g, m/n=7) were dissolved in 100 ml of sufficiently purified THF under a nitrogen atmosphere, and thereafter, 0.36 g of dibutyltin dilaurate was added thereto. Reaction was run at 25° C. for about 15 hours to obtain compound 10 as a colorless viscous liquid. $^1$H-NMR, IR and elemental analyses were made, and the results revealed that MOI and compound 9 reacted in a molar proportion of 4:1, and that the isocyanate group in MOI disappeared and urethane bonds were formed.

(2) Production and evaluation of a compound 10-based solid polymer electrolyte 1.46 g of compound 10 was dissolved in 100 ml of THF and 0.14 g of LiCF$_3$SO$_3$ was added thereto and mixed well. Then, THF was removed at room temperature under reduced pressure. Thus, a compound 10/LiCF$_3$SO$_3$ mixture (polymerizable monomer mixture) was obtained as a viscous liquid. Under argon atmosphere, a portion of the mixture thus obtained was applied on a glass plate, and heated at 100° C. for 1 hour to produce a compound 10 polymer/LiCF$_3$SO$_3$ composite as a transparent, free-standing film of about 20 μm thickness. The ionic conductivity of the film measured at 25° C. by an impedance method was 1×10$^{-5}$ S/cm.

EXAMPLE 71

1.50 g of compound 10, 1.3 g of propylene carbonate (PC), 1.3 g of ethylene carbonate (EC) and 0.56 g of LiBF$_4$ were mixed well under an argon atmosphere to produce a polymerizable monomer mixture consisting of a compound 10/PC/EC/LiBF$_4$ mixture as a viscous liquid.

Under argon atmosphere, the mixture was applied on a glass plate, and heated at 100° C. for 1 hour to produce a compound 10 polymer/PC/EC/LiBF$_4$ composite as a transparent, free-standing film of about 50 μm thickness. The ionic conductivity of the film measured at 25° C. and −10° C. by an impedance method was 2.5×10$^{-3}$ S/cm and 0.7×10$^{-3}$ S/cm, respectively.

EXAMPLE 72

1.20 g of ω-methyloligooxyethyl methacrylate,

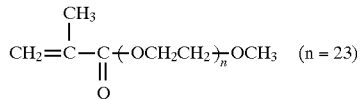

NK-ester M-230G (Product of Shinnakamura Chemical Industrial Co., LTD.) and 1.20 g of compound 2 synthesized in Example 58 were dissolved in 100 ml of THF and 0.14 g of LiCF$_3$SO$_3$ was added thereto and mixed well. Then, THF was removed at room temperature under reduced pressure. Thus, an M-230G/compound 2/LiCF$_3$SO$_3$ mixture (polymerizable monomer mixture) was obtained as a viscous liquid. Under argon atmosphere, a portion of the mixture thus obtained was applied on a glass plate, and heated at 100° C. for 1 hour to produce a [M-230G/compound 2] copolymer/LiCF$_3$SO$_3$ composite as a transparent, free-standing film of about 20 μm thickness. The ionic conductivity of the film measured at 25° C. by an impedance method was 8×10$^{-6}$ S/cm.

EXAMPLE 73

0.50 g of DMAA (N,N-dimethyl acrylamide) and 1.90 g of compound 2 synthesized in Example 58 were dissolved in 100 ml of THF and 0.14 g of LiCF$_3$SO$_3$ was added thereto and mixed well. Then, THF was removed at room temperature under reduced pressure. Thus, a DMAA/compound 2/LiCF$_3$SO$_3$ mixture (polymerizable monomer mixture) was obtained as a viscous liquid. Under argon atmosphere, a portion of the mixture thus obtained was applied on a glass plate, and heated at 100° C. for 1 hour to produce a [DMAA/compound 2] copolymer/LiCF$_3$SO$_3$ composite as a transparent, free-standing film of about 20 μm thickness. The ionic conductivity of the film measured at 25° C. by an impedance method was 2×10$^{-5}$ S/cm.

EXAMPLE 74

0.50 g of PEO-1 (polyethylene oxide, Product of Sumitomo Seika K. K.) and 1.90 g of compound 2 synthesized in Example 58 were dissolved in 100 ml of THF and 0.14 g of LiCF$_3$SO$_3$ was added thereto and mixed well. Then, THF was removed at room temperature under reduced pressure. Thus, a PEO-1/compound 2/LiCF$_3$SO$_3$ mixture (polymerizable monomer mixture) was obtained as a viscous liquid. Under argon atmosphere, a portion of the mixture thus obtained was applied on a glass plate, and heated at 100° C. for 1 hour to produce a PEO-1/compound 2 polymer/LiCF$_{SO3}$ composite as a transparent, free-standing film of about 20 μm thickness. The ionic conductivity of the film measured at 25° C. by an impedance method was 1×10$^{-5}$ S/cm.

EXAMPLE 75

Production of a positive electrode comprising cobalt oxide and solid polymer electrolyte 11 g of Li$_2$CO$_3$ and 24 g of Co$_3$O$_4$ were mixed well and heated at 800° C. for 24 hours under an oxygen atmosphere, followed by pulverizing to obtain LiCoO$_2$ powder. The LiCoO$_2$ powder and the polymerizable monomer mixture produced in Example 69 were mixed in proportion by weight of 7:3 under an argon atmosphere, and the mixture was applied on a stainless steel foil in an area of 1 cm×1 cm and to a thickness of about 200 μm. Further, the coated foil was heated at about 100° C. for 1 hour for polymerization to produce a cobalt oxide/solid polymer electrolyte composite positive electrode (65 mg).

EXAMPLE 76

Fabrication of secondary battery comprising solid polymer electrolyte

In a glove box under an argon atmosphere, a lithium foil of 75 μm thickness was cut to a piece of 1 cm×1 cm (5.3 mg). At each edge portion (1 mm width) of the foil was covered with a polyimide film of 5 μm thickness as a spacer. Next, 15 mg of the polymerizable monomer mixture produced in Example 69 was applied on the lithium foil, and then, the cobalt oxide positive electrode produced in Example 75 was tightly fitted onto the mixture-coated surface of the lithium foil. The resulting structure was heated at 100° C. for 1 hour, and the edge portions of the battery were sealed with an epoxy resin to produce a solid-state lithium/cobalt oxide secondary battery having a structure same as shown in FIG. 2

This battery was subjected to repeated charging and discharging at an operating voltage of 2.0 to 4.3 V and at a constant current of 0.3 mA. As a result, it revealed that the maximum discharge capacity was 3.8 mAh, and a cycle life until the capacity decreased to 50% was 167 times.

EXAMPLE 77

Production of a positive electrode comprising polyaniline and solid polymer electrolyte Electrolytic oxidative electrochemical polymerization was performed on a 1 cm×1 cm stainless steel foil using a graphite foil as the counter electrode and a 0.5M aqueous aniline solution and a 1.5 M aqueous $HBF_4$ solution by a constant current method at a current of 1 mA to obtain a film of about 100 μm thickness. Then, the film was washed with methanol and dried at 80° C. for 24 hours under vacuum.

Then, the thus obtained film (15 mg in weight) was transferred into a glove box under an argon atmosphere, and impregnated with the polymerizable monomer mixture produced in Example 69. Then, polymerization was performed at 100° C. for 1 hour to produce a positive electrode comprising polyaniline/solid polymer electrolyte (45 mg).

EXAMPLE 78

Fabrication of secondary battery comprising lithium, polyaniline and solid polymer electrolyte A lithium/polyaniline solid secondary battery was produced in the same manner as in Example 76 except that the positive electrode comprising polyaniline and solid polymer electrolyte produced in Example 77 was used instead of that comprising cobalt oxide.

This battery was subjected to repeated charging and discharging at an operating voltage of 2.0 to 4.0 V and at a constant current of 0.3 mA. As a result, it revealed that the maximum discharge capacity was 0.9 mAh, and a cycle life until the capacity decreased t o 50% was 280 times.

EXAMPLE 79

Production of a negative electrode comprising graphite and solid polymer electrolyte 10 g of graphite fiber produced by a vapor phase method and subsequent graphatization by Showa Denko K. K. (average fiber diameter: 0.3 μm, average fiber length: 2.0 μm, heat treated at 2,700° C.) was mixed with 200 ml of 2.5M butyllithium solution in n-hexane and stirred for 8 hours at room temperature to incorporate lithium ion in advance, followed by washing with hexane and drying in vacuo. 6 g of the graphite fiber thus prepared which incorporated lithium at an atomic ratio of C/Li=12/1 (determined by elemental analysis) and 4 g of the polymerizable monomer mixture prepared in Example 69 were mixed under an argon atmosphere and an aliquot of the mixture was applied on a stainless steel foil to an area of 1 cm×1 cm and a thickness of about 150 /μm. The coated foil was heated at about 100° C. for 1 hour for polymerization to produce a negative electrode comprising a graphite (C/Li=12/1) and solid polymer electrolyte (21 mg).

EXAMPLE 80

Fabrication of a secondary battery comprising graphite, cobalt oxide and solid polymer electrolyte electrode A graphite/cobalt oxide solid secondary battery was produced in the same manner as in Example 76 except that the negative electrode comprising graphite (C/Li=12/1) and solid polymer electrolyte produced in Example 79 was used instead of the lithium foil. This battery was subjected to repeated charging and discharging at an operating voltage of 1.5 to 4.3 V and at a constant current of 0.3 mA. As a result, it revealed that the maximum discharge capacity was 3.6 mAh, and a cycle life until the capacity decreased to 50% was 185 times.

EXAMPLE 81

Production of a positive electrode comprising polyaniline and solid polymer electrolyte In a glove box under an argon atmosphere, the polymerizable monomer mixture prepared in Example 69 was mixed with the 5 wt % polyaniline/NMP mixture prepared in Example 27 so that the proportion by weight of the polyaniline and the polymerizable monomer mixture was 1:1.

The resulting mixture was applied on a stainless steel foil of a size of 15×15 mm and of a thickness of 100 μm in an area surrounded by a polyimide film of 50 μm thickness affixed to each edge portion of the foil in a width of 3 mm.

Then, the foil coated with the mixture was heated at 60° C., 80° C. and 100° C. each for 1 hour to dry the coating and polymerize the monomers to produce a positive electrode comprising polyaniline and solid polymer electrolyte (68 mg).

EXAMPLE 82

Fabrication of secondary battery comprising lithium, polyaniline and solid polymer electrolyte In a glove box under an argon atmosphere, a lithium foil of 25 μm thick was cut to a piece of 12×12 mm (2.6 mg). At each edge portion (2 mm width) of the foil was covered with a polyimide film of 5 μm thickness as a spacer. Next, a portion of the polymerizable monomer mixture prepared in Example 71 was applied on the lithium foil, and then the polyaniline positive electrode produced in Example 81 was tightly fitted onto the coated surface of the lithium foil. The resulting structure was heated at 100° C. for 1 hour, and the edge portions of the battery were sealed with an epoxy resin to produce a solid-state lithium/polyaniline secondary battery having a structure same as shown in FIG. 2.

This battery was subjected to repeated charging and discharging at an operating voltage of 2 to 4 V and at a constant current density of 0.3 mA. As a result, it revealed that the maximum discharge capacity was 1.3 mAh, and a cycle life until the capacity decreased to 50% was 170 times.

EXAMPLE 83

2.50 g of compound 2 synthesized in Example 58, 4.0 g of propylene carbonate (PC) and 0.90 g of ethyltributylammnonium perchlorate (EBAP) were mixed well under argon atmosphere to produce a polymerizable monomer mixture comprising compound 2/PC/EBAP as a viscous liquid.

Under argon atmosphere, a portion of the polymerizable monomer mixture thus obtained was applied on a glass plate, and heated at 100° C. for 1 hour to produce a compound 2 polymer/PC/EBAP composite as a transparent, free-standing film of about 50 μm thickness. The ionic conductivities of the film measured at 25° C. and −10° C. by an impedance method were $2.5 \times 10^{-3}$ S/cm and $0.7 \times 10^{-3}$ S/cm, respectively.

EXAMPLE 84
Production of an activated carbon electrode

Coconut shell activated carbon and the polymerizable monomer mixture prepared in Example 83 were mixed in a proportion by weight of 1:1 under an argon atmosphere, and a portion of the mixture was applied on a stainless steel foil to an area of 1 cm×1 cm and a thickness of about 150 μm. Further, the coated foil was heated at about 100° C. for 1 hour for polymerization to produce an activated carbon/solid polymer electrolyte composite electrode (13 mg).

EXAMPLE 85
Fabrication of a solid-state electric double layer capacitor

In a glove box under an argon atmosphere, the activated carbon electrode (13 mg of an area of 1 cm×1 cm produced in Example 84 was covered with a polyimide film of 5 μm thick as a spacer at each edge portion (1 mm width) thereof. Next, a portion of the polymerizable monomer mixture produced in Example 83 was applied on the electrode, and then another activated carbon electrode was tightly fitted thereto. The resulting frame was heated at 100° C. for 1 hour, and the edge portions of the battery were sealed with an epoxy resin to produce a solid-state electric double layer capacitor having a cross-sectional structure as shown in FIG. 3.

This capacitor was subjected to repeated charging and discharging at an operating voltage of 0 to 2.5 V and at a current of 0.3 mA. As a result, it revealed that the maximum discharge capacity was 200 mF. When the charging and discharging were repeated 50 times under this condition, there was no substantial change in the capacity.

EXAMPLE 86
Fabrication of a solid-state electric double layer capacitor

A polymerizable monomer mixture was prepared in the same manner as in Example 83 except that 0.3 g of lithium perchlorate ($LiClO_4$) was used instead of the salt EBAP.

A solid electric double layer capacitor was fabricated in the same manner as in Example 85 except that the polymerizable monomer mixture thus obtained was used.

This capacitor was subjected to repeated charging and discharging at an operation voltage of 0 to 2.0 V and at a current of 0.3 mA. As a result, it revealed that the maximum discharge capacity was 140 mF. When the charging and discharging were repeated 50 times under this condition, there was no substantial change in the capacity.

EXAMPLE 87
Production of an acetylene black electrode

Acetylene black and the polymerizable monomer mixture used in Example 83 were mixed in a proportion by weight of 6:4 under an argon atmosphere, and the resulting mixture was applied on a stainless steel foil to an area of 1 cm×1 cm and a thickness of about 150 μm. Further, the coated foil was heated at about 100° C. for 1 hour for polymerization to produce an electrode comprising acetylene black and solid polymer electrolyte (14 mg).

EXAMPLE 88
Fabrication of a solid-state electric double layer capacitor

A solid-state electric double layer capacitor was fabricated in the same manner as in Example 85 except that the electrode (14 mg) comprising acetylene black and solid polymer electrolyte produced in Example 87 was used.

This capacitor was subjected to repeated charging and discharging at an operating voltage of 0 to 2.5 V and at a current of 0.3 mA. As a result, it revealed that the maximum discharge capacity was 45 mF. When the charging and discharging were repeated 50 times under this condition, there was no substantial change in the capacity.

EXAMPLE 89
(1) Synthesis of compound 12

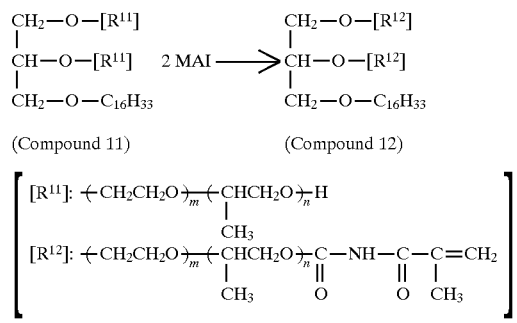

1-O-hexadecyl-rac-glycerol (Product of SIGMA Chemical Co.) was reacted with ethylene oxide and propylene oxide to obtain a compound 11 (KOH value: 21.0 mg/g, m/n=5) according to the method described in Can. J. Res., 8, 102 (1933).

1.73 g of MAI and 53.3 g of compound 11 were dissolved in 100 ml of sufficiently purified THF under a nitrogen atmosphere, and thereafter, 0.29 g of dibutyltin dilaurate was added thereto. Reaction was run at 25° C. for about 15 hours to obtain compound 12 as a colorless viscous liquid. $^1$H-NMR, IR and elemental analyses were made, and the results revealed that MAI and compound 11 reacted in a molar proportion of 2:1, and that the isocyanate group in MAI disappeared and urethane bonds were formed.

(2) Production and evaluation of a compound 12-based solid polymer electrolyte 1.46 g of compound 12 was dissolved in 100 ml of THF and 0.14 g of $LiCF_3SO_3$ was added thereto and mixed well. Then, THF was removed at room temperature under reduced pressure. Thus, a compound $12/LiCF3SO_3$ mixture (polymerizable monomer mixture) was obtained as a viscous liquid. Under argon atmosphere, a portion of the mixture thus obtained was applied on a glass plate, and heated at 100° C. for 1 hour to produce a compound 12 polymer/$LiCF_3SO_3$ composite as a transparent, free-standing film of about 30 μm thickness. The ionic conductivity of the film measured at 25° C. by an impedance method was $1 \times 10^{-5}$ S/cm.

INDUSTRIAL APPLICABILITY

The solid polymer electrolyte of the present invention comprises a composite comprising a polymer having a side chain of an oxyalkyl group containing a urethane bond and at least one electrolyte salt, and can be readily formed into a thin film, plate or disk having good strength and high ionic conductivity.

A battery and a capacitor using the solid polymer electrolyte of the present invention does not suffer from the danger of leakage of the liquid since the ionic conducting substance thereof is solid; therefore, it can be used with stability for a long time. The use of this solid polymer electrolyte enables fabrication of a thin battery and a thin capacitor.

The electrode of the present invention comprising a polymer having a side chain of an oxyalkyl group containing a urethane bond and an electroactive substance such as an aniline-based polymer soluble in an organic solvent, other electroconductive polymer, metal oxide, metal sulfide and carbon material or polarizable material and the manufacturing process of the same provide an electrode having a high electrochemical activity and flexibility, especially a thin electrode having such properties. Accordingly, the electrode of the present invention is useful in providing electrodes usable in various batteries and electric double layer capacitors and in providing the process for manufacturing the same.

Further, the battery of the present invention not only can operate at a high capacity and a large current as a whole solid type, but also can give good cyclability and assure excellent safety and reliability. Therefore, the battery of the present invention can be used as a power source for electric products such as a main power source for portable devices, as a backup power source, as well as a power source of large capacity for such as electric automobiles, and road leveling. Since it can easily be made into a thin film, the battery of the present invention can be used as a paper battery, such as one for an identification card.

Further, the solid-state electric double layer capacitor of the present invention, as compared with conventional whole solid-state electric double layer capacitors, can operate at a high capacity and a large current as a whole solid type, but also can give good cyclability and assure excellent safety and reliability and provides whole solid type electric double layer capacitor having such features. Therefore, it can be used not only as a backup power source but also as a power source for various electric products when used in combination with a battery. Since the capacitor of the present invention is excellent in processability such as rendering into a thin film, it is expected to be used in various applications other than those developed by conventional solid-state electric double layer capacitors.

We claim:

1. A polymerizable composition useful in forming an ion conductive polymeric composite, comprising (i) at least one compound having at least three organic chains, wherein said organic chain comprises an ethylenically unsaturated group, a —O—(C=O)—NH— group and at least one oxyalkylene group, and (ii) a salt.

2. A polymerizable composition useful in forming an ion conductive polymeric composite, comprising (i) at least one compound having at least three organic chains, wherein said organic chain comprises an ethylenically unsaturated group, a —O—(C=O)—NH— group and at least one oxyalkylene group, (ii) a salt, and (iii) a solvent.

3. A polymerizable composition useful in forming an ion conductive polymeric composite, comprising (i) at least one compound having at least four organic chains, wherein said organic chain comprises an ethylenically unsaturated group, a —O—(C=O)—NH— group and at least one oxyalkylene group, and (ii) a salt.

4. A polymerizable composition useful in forming an ion conductive polymeric composite, comprising (i) at least one compound having at least four organic chains, wherein said organic chain comprises an ethylenically unsaturated group, a —O—(C=O)—NH— group and at least one oxyalkylene group, (ii) a salt, and (iii) a solvent.

5. A polymerizable composition useful in forming an ion conductive polymeric composite as claimed in any one of claims 1 to 4, wherein said ethylencially unsaturated group is a group having an ethylenically unsaturated unit selected from the group consisting of $CH_2=C(R^1)-$, $CH_2=C(R^1)C(=O)-$ and $CH_2=C(R^1)C(=O)O-$, wherein $R^1$ represents a hydrogen atom or a methyl group.

6. A method for forming an ion conductive polymeric composite, which comprises providing a polymerizable composition comprising (i) at least one compound having at least three organic chains, wherein said organic chain comprises an ethylenically unsaturated group, a —O—(C=O)—NH— group and at least one oxyalkylene group and (ii) a salt, and subjecting said composition to heating and/or irradiation to thereby crosslink said composition.

7. A method for forming an ion conductive polymeric composite, which comprises providing a polymerizable composition comprising (i) at least one compound having at least three organic chains, wherein said organic chain comprises an ethylencially unsaturated group, a —O—(C=O)—NH— group and at least one oxyalkylene group, (ii) a salt and (iii) a solvent, and subjecting said composition to heating and/or irradiation to thereby crosslink said composition.

8. A method for forming an ion conductive polymeric composite, which comprises providing a polymerizable composition comprising (i) at least one compound having at least four organic chains, wherein said organic chain comprises an ethylencially unsaturated group, a —O—(C=O)—NH— group and at least one oxyalkylene group and (ii) a salt, and subjecting said composition to heating and/or irradiation to thereby crosslink said composition.

9. A method for forming an ion conductive polymeric composite, which comprises providing a polymerizable composition comprising (i) at least one compound having at least four organic chains, wherein said organic chain comprises an ethylenically unsaturated group, a —O—(C=O)—NH— group and at least one oxyalkylene group, (ii) a salt, and (iii) a solvent, and subjecting said composition to heating and/or irradiation to thereby crosslink said composition.

10. A method for forming an ion conductive polymeric composite as claimed in any one of claims 6 to 9, wherein said ethylencially unsaturated group is a group having an ethylencially unsaturated unit selected from the group consisting of $CH_2=C(R^1)-$, $CH_2=C(R^1)C(=O)-$ and $CH_2=C(R^1)C(=O)O-$, wherein $R^1$ represents a hydrogen atom or a methyl group.

11. An electrochemical apparatus comprising an ion conductive polymeric composite produced according to the method as claimed in any one of claims 6 to 9.

12. A battery comprising an ion conductive polymeric composite produced according to the method as claimed in any one of claims 6 to 9.

13. A capacitor comprising an ion conductive polymeric composite produced according to the method as claimed in any one of claims 6 to 9.

14. A compound having at least three organic chains, wherein said organic chain comprises an ethylencially unsaturated group, a —O—(C=O)—NH— group and at least one oxyalkylene group.

15. A compound having at least four organic chains, wherein said organic chain comprises an ethylenically unsaturated group, a —O—(C=O)—NH— group and at least one oxyalkylene group.

16. A method for producing a compound having at least three organic chains, wherein said organic chain comprises an ethylencially unsaturated group, a —O—(C=O)—NH— group and at least one oxyalkylene group, comprising providing a compound having at least three alcoholic hydroxyl groups and replacing at least three hydrogen atoms of said alcoholic hydroxy groups by a unit represented by an organic chain containing an ethylenically unsaturated group and a —O—(C=O)—NH— group.

17. A method for producing a compound having at least three organic chains, wherein said organic chain comprises an ethylencially unsaturated group, a —O—(C=O)—NH— group and at least one oxyalkylene group, comprising reacting a compound having at least three alcoholic hydroxyl groups with an isocyanide compound having an ethylencially unsaturated group and an oxyalkylene group.

18. A method for producing a compound having at least three organic chains, wherein said organic chain comprises an ethylencially unsaturated group, a —O—(C=O)—NH— group and at least one oxyalkylene group, comprising reacting a compound having at least three alcoholic hydroxyl groups and at least one oxyalkylene group with an isocyanate compound having an ethylenically unsaturated group.

19. A method for producing a compound having at least three organic chains, wherein said organic chain comprises an ethylencially unsaturated group, a —O—(C=O)—NH— group and at least one oxyalkylene group, comprising reacting a compound having at least three alcoholic hydroxyl groups and at least one oxyalkylene group with an isocyanide compound having an ethylencially unsaturated group and an oxyalkylene group.

20. A method for producing a compound having at least three organic chains according to the method as claimed in any one of claims 16 to 19, wherein said compound is a compound having at least four said organic chains, and the reacting compound is a compound having at least four alcoholic hydroxyl groups.

* * * * *